US010150366B2

(12) United States Patent
Yamashita et al.

(10) Patent No.: US 10,150,366 B2
(45) Date of Patent: Dec. 11, 2018

(54) WORK MACHINE WITH TANK SUPPORTED ON BONNET

(71) Applicant: KUBOTA CORPORATION, Osaka-shi (JP)

(72) Inventors: Yuji Yamashita, Sakai (JP); Ryohei Sumiyoshi, Sakai (JP); Toyoaki Yasuda, Sakai (JP); Toshihiko Takemura, Sakai (JP); Kunihiro Suzuki, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 87 days.

(21) Appl. No.: 15/390,678

(22) Filed: Dec. 26, 2016

(65) Prior Publication Data

US 2017/0106745 A1 Apr. 20, 2017

Related U.S. Application Data

(63) Continuation of application No. PCT/JP2015/058552, filed on Mar. 20, 2015.

(30) Foreign Application Priority Data

Sep. 30, 2014 (JP) .................................. 2014-202399

(51) Int. Cl.
*B60K 15/063* (2006.01)
*B62D 25/10* (2006.01)
(Continued)

(52) U.S. Cl.
CPC .......... *B60K 15/067* (2013.01); *B60K 15/063* (2013.01); *B60K 15/07* (2013.01);
(Continued)

(58) Field of Classification Search
CPC .......... B60K 2015/0638; B60K 15/067; B60K 15/07; B60K 11/06; B60K 15/063;
(Continued)

(56) References Cited

U.S. PATENT DOCUMENTS 3,834,478 A * 9/1974 Alexander ............. B60K 11/04
165/77
6,098,739 A 8/2000 Anderson et al.
(Continued)

FOREIGN PATENT DOCUMENTS

JP 52-128214 U1 9/1977
JP 55-0078567 U1 5/1980
(Continued)

OTHER PUBLICATIONS

International Search Report for corresponding International Application No. PCT/JP2015/058552, dated Jun. 9, 2015.

*Primary Examiner* — Laura Freedman
(74) *Attorney, Agent, or Firm* — Mori & Ward, LLP

(57) ABSTRACT

A work machine includes a machine body, a motor provided in a rear portion of the machine body, a bonnet which covers a rear of the motor and which is openable, a tank disposed between the motor and the bonnet, and a support member. The support member includes a bracket supporting the tank on the bonnet such that the tank is separated from the bonnet.

9 Claims, 15 Drawing Sheets

(51) Int. Cl.
    *B60K 15/07*     (2006.01)
    *E02F 9/08*     (2006.01)
    *B60K 11/06*     (2006.01)
    *E02F 3/34*     (2006.01)
    *B60K 5/12*     (2006.01)
    *B60K 11/04*     (2006.01)
    *B60K 15/067*     (2006.01)

(52) U.S. Cl.
    CPC ............ B62D 25/10 (2013.01); E02F 9/0883 (2013.01); E02F 9/0891 (2013.01); *B60K 5/1216* (2013.01); *B60K 11/04* (2013.01); *B60K 11/06* (2013.01); *B60K 2015/0638* (2013.01); *B60Y 2200/415* (2013.01); *E02F 3/3414* (2013.01)

(58) Field of Classification Search
    CPC ..... B60K 11/04; B60K 5/1216; E02F 9/0883; E02F 9/0891; E02F 3/3414; B62D 25/10; B60Y 2200/415
    See application file for complete search history.

(56) References Cited

U.S. PATENT DOCUMENTS

| | | | | |
|---|---|---|---|---|
| 7,255,189 | B2* | 8/2007 | Kurtz, Jr. | ............... B60K 11/04 123/41.43 |
| 7,399,020 | B2* | 7/2008 | Aoyama | ................ B60R 13/08 296/39.3 |
| 8,038,379 | B2* | 10/2011 | Yamashita | ............ B62D 33/067 180/89.18 |
| 8,240,415 | B2* | 8/2012 | Okada | .................... B62D 25/12 180/69.2 |
| 8,342,277 | B2* | 1/2013 | Kotani | .................... F28F 9/002 180/68.4 |
| 8,602,147 | B2* | 12/2013 | Miyachi | ............... B60K 15/063 180/69.2 |
| 9,567,729 | B2* | 2/2017 | Sumiyoshi | ............... B60K 5/02 |
| 9,752,302 | B2* | 9/2017 | Yamashita | ............ E02F 3/3414 |
| 9,828,744 | B2* | 11/2017 | Sumiyoshi | ............... B60K 5/02 |
| 9,914,486 | B2* | 3/2018 | Remes | ..................... B60S 1/50 |
| 2004/0142232 | A1 | 7/2004 | Risca et al. | |
| 2016/0288845 | A1* | 10/2016 | Honda | ................. E02F 3/3414 |

FOREIGN PATENT DOCUMENTS

| | | |
|---|---|---|
| JP | 61-261125 | 11/1986 |
| JP | 63-31095 U | 2/1988 |
| JP | 11-82178 | 3/1999 |
| JP | 2003-020680 | 1/2003 |
| JP | 2008149767 A * | 7/2008 |
| JP | 2010-265713 | 11/2010 |
| JP | 2011000932 A * | 1/2011 |

* cited by examiner

WORK MACHINE WITH TANK SUPPORTED ON BONNET

CROSS-REFERENCE TO RELATED APPLICATIONS

The present application is a continuation application of International Application No. PCT/JP2015/058552, filed Mar. 20, 2015, which claims priority to Japanese Patent Application No. 2014-202399, filed Sep. 30, 2014. The contents of these applications are incorporated herein by reference in their entirety.

BACKGROUND OF THE INVENTION

Field of the Invention

The present invention relates to a work machine.

Discussion of the Background

As described in U.S. Pat. No. 6,098,739, a work machine such as a skid steer loader and a track loader generally arranges an engine (a motor) on a rear portion of a machine body and arranges a fuel tank for fuel storage in an engine room (a motor room).

SUMMARY OF THE INVENTION

A work machine includes a machine body, a motor provided in a rear portion of the machine body, a bonnet which covers a rear of the motor and which is openable, a tank disposed between the motor and the bonnet, and a support member including a bracket supporting the tank on the bonnet such that the tank is separated from the bonnet.

A work machine includes a machine body, a motor provided in a rear portion of the machine body, a bonnet disposed behind a rear of the motor, a tank disposed between the motor and the bonnet, and a support member including a bracket supporting the tank on the bonnet such that the tank is separated from the bonnet.

A work machine includes a machine body, a motor provided in a rear portion of the machine body, a bonnet separated from the motor, a tank disposed between the motor and the bonnet and including a projection, and a support member supporting the tank such that the tank is separated from the bonnet, the support member including an edge portion having a circular shape to define an opening portion through which the projection of the tank is inserted.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
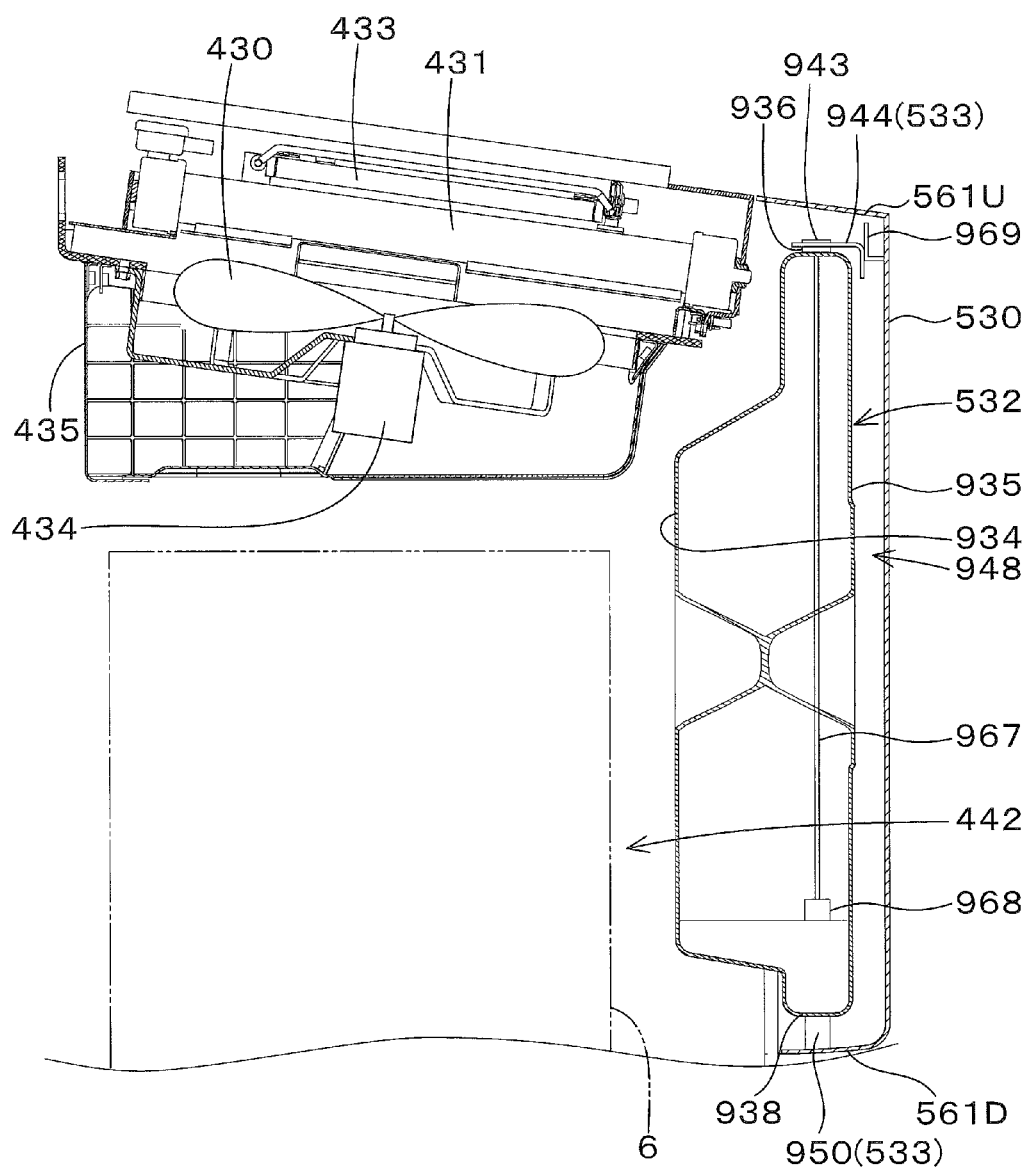
FIG. 1 is a schematic longitudinal cross-section view of a major portion of a rear portion of a work machine according to an embodiment of the present invention.

The embodiment will now be described with reference to the accompanying drawings, wherein like reference numerals designate corresponding or identical elements throughout the various drawings. The drawings are to be viewed in an orientation in which the reference numerals are viewed correctly.

Referring to drawings, an embodiment of the present invention will be described below.

Figure 13:
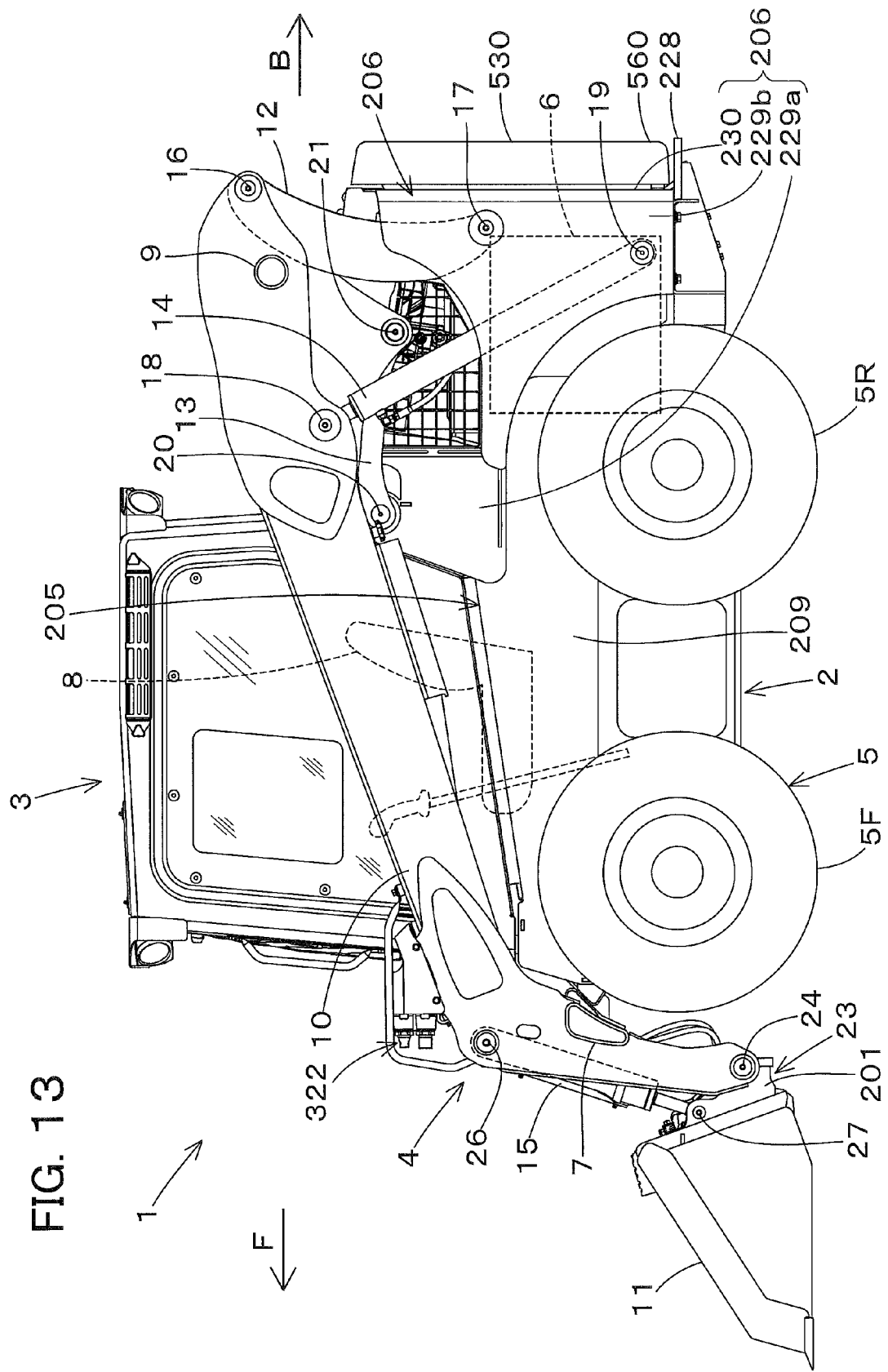
FIG. 13 is a side view illustrating a work machine according to the embodiment.
Figure 14:
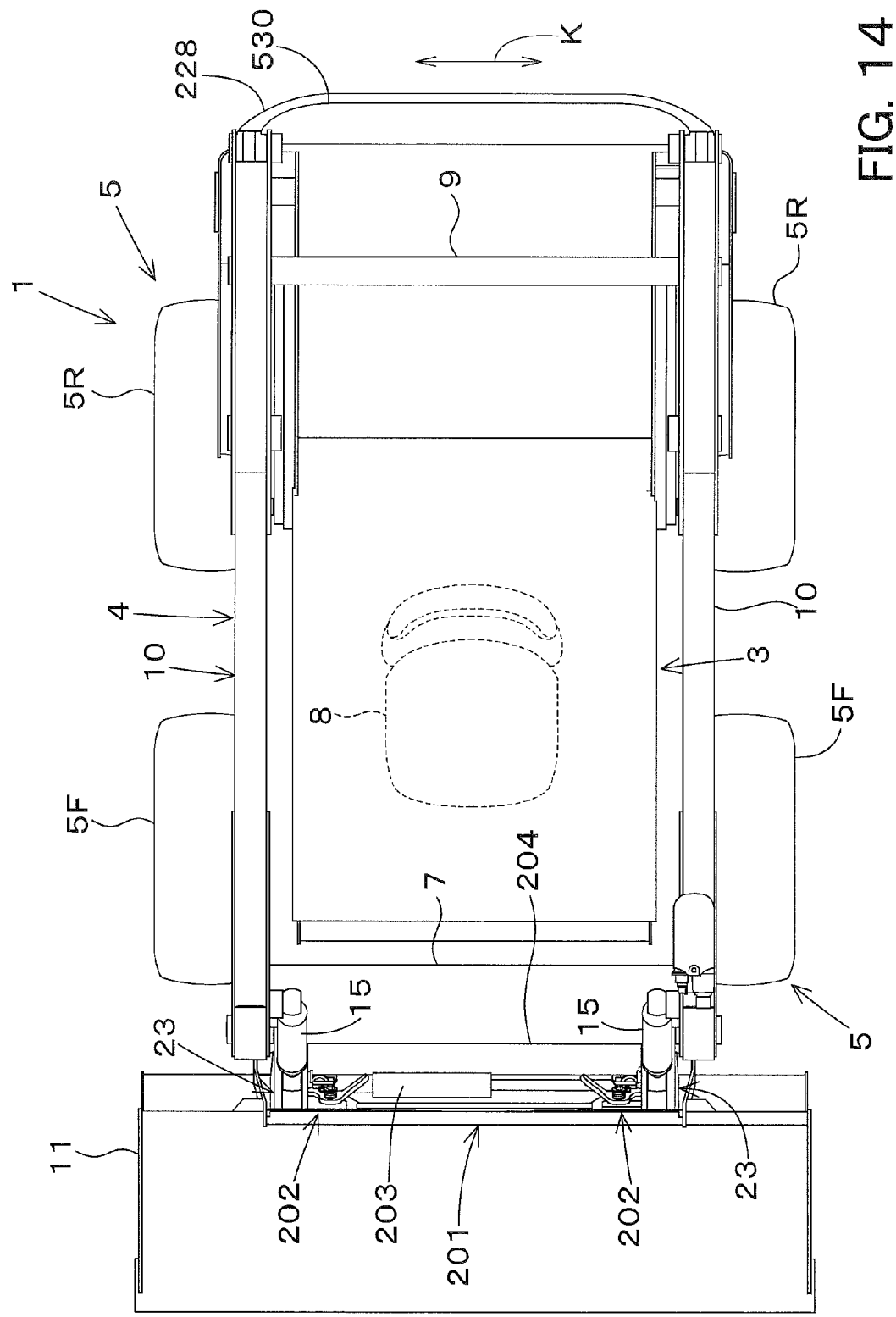
FIG. 14 is a plan view illustrating a work machine according to the embodiment.
Figure 15:
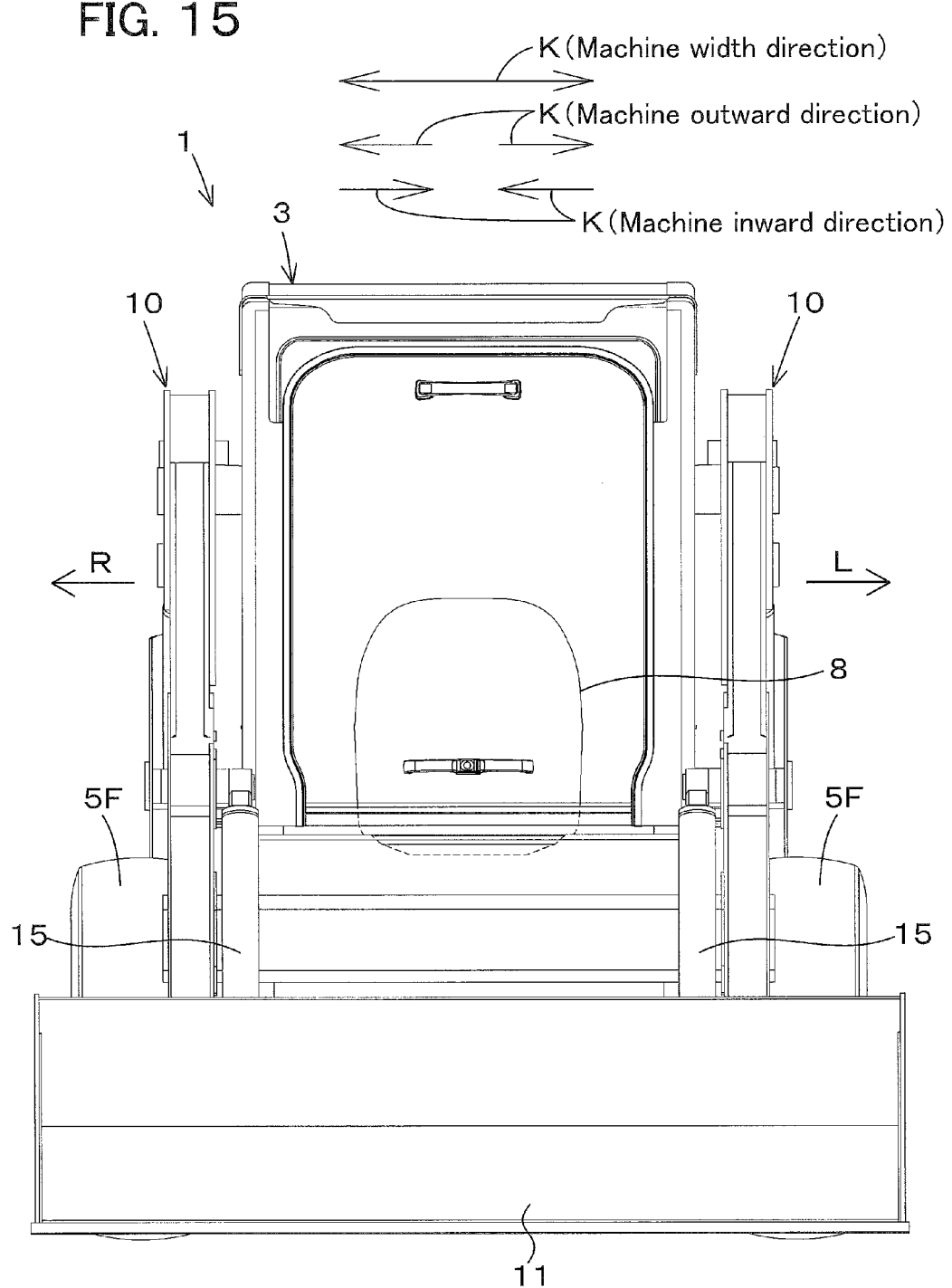
FIG. 15 is a front view illustrating a work machine according to the embodiment.

FIG. 13 is a side view of a work machine 1 according to an embodiment of the present invention. FIG. 14 is a plan view of the work machine 1. FIG. 15 is a front view of the work machine 1. FIG. 13 to FIG. 15 show a Skid Steer Loader (SSL) as an example of the work machine 1 according to the embodiment of the present invention. The work machine 1 according to the embodiment also referred to as a skid steer loader 1. The work machine according to the embodiment of the present invention however is not limited to the Skid Steer Loader (SSL), and can be other types of the work machine, for example, a Track Loader (TL), a Compact Track Loader (CTL), and the like.

The work machine 1 includes a body 2 of the work machine (hereinafter referred to as a machine body 2), a cabin 3, an operation device 4, and travel devices 5. The cabin 3 is mounted on the machine body 2. The operation device 4 is attached to the machine body 2. The work machine 1 includes two travel devices 5; one of the travel devices 5 is disposed on a right portion of the machine body 2, and the other one is provided on a left portion of the machine body 2. A motor 6 is mounted on a rear portion of the machine body 2. An operator seat 8 is disposed in the cabin 3. The motor 6 is an engine, an electric motor, and the like. The work machine 1 according to the embodiment employs a diesel engine. Hereinafter, in explanations of all the embodiment of the present invention, a forward direction (a direction shown by an arrowed line F in FIG. 13) corresponds to a front side of an operator seating on the operator seat 8 of the work machine 1, a backward direction (a direction shown by an arrowed line B in FIG. 13) corresponds to a back side of the operator, a leftward direction (a direction shown by an arrowed line L in FIG. 15) corresponds to a left side of the operator, and a rightward direction (a direction shown by an arrowed line R in FIG. 15) corresponds to a right side of the operator.

In addition, in explanations of all the embodiment of the present invention, a direction from the front side shown by the arrowed line F toward the back side shown by the arrowed line B (or a direction from the back side shown by the arrowed line B toward the front side shown by the arrowed line A) is referred to as a front to rear direction (or a rear to front direction), and a horizontal direction perpendicular to the front to rear direction (or the rear to front direction) is a horizontal direction K extending along a width of the machine body 2. The horizontal direction K extending along the width of the machine body 2 is hereinafter referred to as the machine width direction K. As shown in FIG. 15, in the following description, a direction from a center portion of the machine body 2 toward the above mentioned right side can be referred to as an outward direction. And, a direction from the center portion of the machine body 2 toward the above mentioned left side can be also referred to as the outward direction. The outward direction is hereinafter referred to as a machine outward direction. In other words, the machine outward direction corresponds to a direction departing from the center portion of the machine body 2 in the machine width direction K. A direction extending opposite to the machine outward direction can be referred to as an inward direction. The inward direction is hereinafter referred to as a machine inward direction. In other words, the machine inward direction corresponds to a direction extending toward the center portion of the machine body 2 in the machine width direction K.

In the following description, an outward direction along a right to left direction (or along a left to right direction) is a direction toward an end portion in a right to left direction (or in a left to right direction) of the skid steer loader 1 from a center portion in the right to left direction (or in the left to right direction), hereinafter the direction being referred to as an "R to L outward". In addition, an inward direction along a right to left direction (or along a left to right direction) is a direction toward the center portion in the right to left direction (or in the left to right direction) of the skid steer loader 1 from the end portion in the right to left direction (or in the left to right direction), hereinafter the direction being referred to as an "R to L inward".

As shown in FIG. 13 and FIG. 15, the operation device 4 includes booms 10, an work tool 11, lift links 12, control links 13, boom cylinders 14, and bucket cylinders 15.

The operation device 4 includes two booms 10; one of the booms 10 is provided on a right side of the cabin 3 (referred to as the right boom 10) and is capable of freely swinging upward and downward, and the other one of the booms 10 is provided on a left side of the cabin 3 (referred to as the left boom 10) and is capable of freely swinging upward and downward. The work tool 11 is a bucket (hereinafter referred to as a bucket 11), for example. The bucket 11 is disposed on tip portions (front end portions) of the booms 10 and is capable of freely swinging upward and downward. The lift link 12 and the control link 13 support a base portion (a rear portion) of the boom 10 so that the boom 10 is capable of freely swinging upward and downward. The boom cylinder 14 is capable of being stretched and shortened to move the boom 10 upward and downward. The bucket cylinder 15 is capable of being stretched and shortened to swing the bucket 11.

The operation device 4 includes a joint pipe 7 having a deformed shape, that is, the joint pipe 7 being a deformed pipe. The joint pipe 7 is connected to a front portion of the right boom 10 and to a front portion of the left boom 10 between the right boom 10 and the left boom 10, thereby jointing the right boom 10 and the left boom 10 with each other.

The operation device 4 includes a joint pipe 9 having a cylindrical shape, that is, the joint pipe 9 being a cylindrical pipe. The joint pipe 9 is connected to a base portion (a rear portion) of the right boom 10 and connected to a base portion (a rear portion) of the left boom 10 between the right boom 10 and the left boom 10, thereby jointing the right boom 10 and the left boom 10 with each other.

The operation device 4 includes two lift links 12, two control links 13, and two boom cylinders 14. One of the lift links 12 (the right lift link 12), one of the control links 13 (the right control link 13), and one of the boom cylinders 14 (the right boom cylinder 14) are disposed on a right side of the machine body 2, corresponding to the right boom 10 (also referred to as the corresponding boom 10). And, the other one of the lift links 12 (the left lift link 12), the other one of the control links 13 (the left control link 13), and the other one of the boom cylinders 14 (the left boom cylinder 14) are disposed on a left side of the machine body 2, corresponding to the left boom 10 (also referred to as the corresponding boom 10).

The lift link 12 is vertically disposed on a rear portion of the base portion of the boom 10. The lift link 12 is supported at an upper portion of the lift link 12 by a pivot shaft 16 (a first pivot shaft) to be capable of freely turning about a horizontal axis of the pivot shaft 16, the lift link 12 being supported on the rear portion of the base portion of the boom 10 by the pivot shaft 16. In addition, the lift link 12 is supported at a lower portion of the lift link 12 by a pivot shaft 17 (a second pivot shaft) to be capable of freely turning about a horizontal axis of the pivot shaft 17, the lift link 12 being supported on the rear portion of the machine body 2 by the pivot shaft 17. The second pivot shaft 17 is disposed lower than the first pivot shaft 16.

The boom cylinder 14 is supported at an upper portion of the boom cylinder 14 by a pivot shaft 18 (a third pivot shaft) to be capable of freely turning about a horizontal axis of the pivot shaft 18. The third pivot shaft 18 is disposed on the base portion of the boom 10 in front of the first pivot shaft 16. The boom cylinder 14 is supported at a lower portion of the boom cylinder 14 by a pivot shaft 19 (a fourth pivot shaft) to be capable of freely turning about a horizontal axis of the pivot shaft 19. The fourth pivot shaft 19 is disposed on a lower portion of the rear portion of the machine body 2, the lower portion being lower than the third pivot shaft 18.

The control link 13 is disposed in front of the lift link 12. One end of the control link 13 is supported by a pivot shaft 20 (a fifth pivot shaft) to be capable of freely turning about a horizontal axis of the pivot shaft 20. The fifth pivot shaft 20 is disposed on the machine body 2. The other end of the control link 13 is supported by a pivot shaft 21 (a sixth pivot shaft) to be capable of freely turning about a horizontal axis of the pivot shaft 21. The sixth pivot shaft 21 is disposed on the boom 10 in front of the second pivot shaft 17, the sixth pivot shaft 21 being disposed higher than the second pivot shaft 17.

Stretching and shortening of the boom cylinder 14 swing the boom 10 upward and downward about the first pivot shafts 16, the boom 10 being supported on the base portion of the boom 10 by the lift link 12 and the control link 13, thereby moving a tip portion of the boom 10 upward and down ward. The control link 13 is swung upward and downward about the fifth pivot shaft 20 by the upward swinging and downward swinging of the boom 10. The lift link 12 is swung forward and backward about the second pivot shaft 17 by the upward swinging and downward swinging of the control link 13.

An attachment device 201 is pivotally supported on each of the front portions (the tip portions) of the booms 10. The bucket 11 is capable of being attached to and detached from the attachment device 201. The attachment device 201 includes an attachment body 23, a lock mechanism 202, and a lock cylinder 203.

A pivot pin 24 is disposed on each of the front portions of the booms 10. An attachment body 23 is pivotally supported on the front portions (the tip portions) of the booms 10 by the pivot pin 24, thereby being capable of freely turning about a horizontal axis of the pivot pin 24. The attachment body 23 disposed on the right side is jointed to the attachment body 23 disposed on the left side by a joint member 204.

The lock mechanism 202 is a member configured to prevent the bucket 11 from being detached from the attachment body 23. The lock cylinder 203 moves the lock mechanism 202, thereby turning the lock mechanism 202 into a locking operation state or into a lock-releasing operation state. The lock cylinder 203 is constituted of a double action hydraulic cylinder.

Not only the bucket 11, other work tools can be attached to the attachment device 201. The following attachments (spare attachments) are exemplified as the other work tools; for example, a hydraulic crusher, a hydraulic breaker, an angle broom, an earth auger, a pallet fork, a sweeper, a mower, a snow blower, and the like.

A hydraulic pressure extraction member 322 is disposed on the front portion of the left boom 10. The hydraulic pressure extraction member 322 is a device configured to connect a hydraulic actuator to a hydraulic hose disposed on the left boom 10, the hydraulic actuator being installed on the spare attachment. The hydraulic pressure extraction member 322 is connected to the hydraulic actuator of the spare attachment by another hydraulic hose. The hydraulic operation fluid is supplied to the hydraulic pressure extraction member 322 at first, and then passes through the hydraulic hose to be supplied to the hydraulic actuator.

The bucket cylinder 15 is arranged closer to the front portion of each of the booms 10. The bucket cylinder 15 is pivotally supported on the boom 10 by a first bucket cylinder pin 26 at an upper portion of the bucket cylinder 15, thereby being capable of freely turning about a horizontal axis of the first bucket cylinder pin 26. The bucket cylinder 15 is pivotally supported on the attachment body 23 by a second bucket cylinder pin 27 at a lower portion of the bucket cylinder 15, thereby being capable of freely turning about a horizontal axis of the second bucket cylinder pin 27. Stretching and shortening of the bucket cylinder 15 swing the bucket 11.

In the embodiment, both of the right travel device 5 and the left travel device 5 employ a wheeled travel device, the wheeled travel device having a front wheel 5F and a rear wheel 5R. However, a crawler travel device (including a semi-crawler travel device) may be employed as the travel device 5.

Next, a concrete configuration of the work machine 1 will be described below.

As shown in FIG. 13, the machine body 2 includes a main frame 205 and a support frame 206. The main frame 205 includes a right frame portion (not shown in the drawing), a left frame portion 209, and a bottom frame portion 211. The left frame portion 209 constitutes a left portion of the machine body 2. The right frame portion constitutes a right portion of the machine body 2. The bottom frame portion 211 constitutes a bottom portion of the machine body 2.

Figure 2:
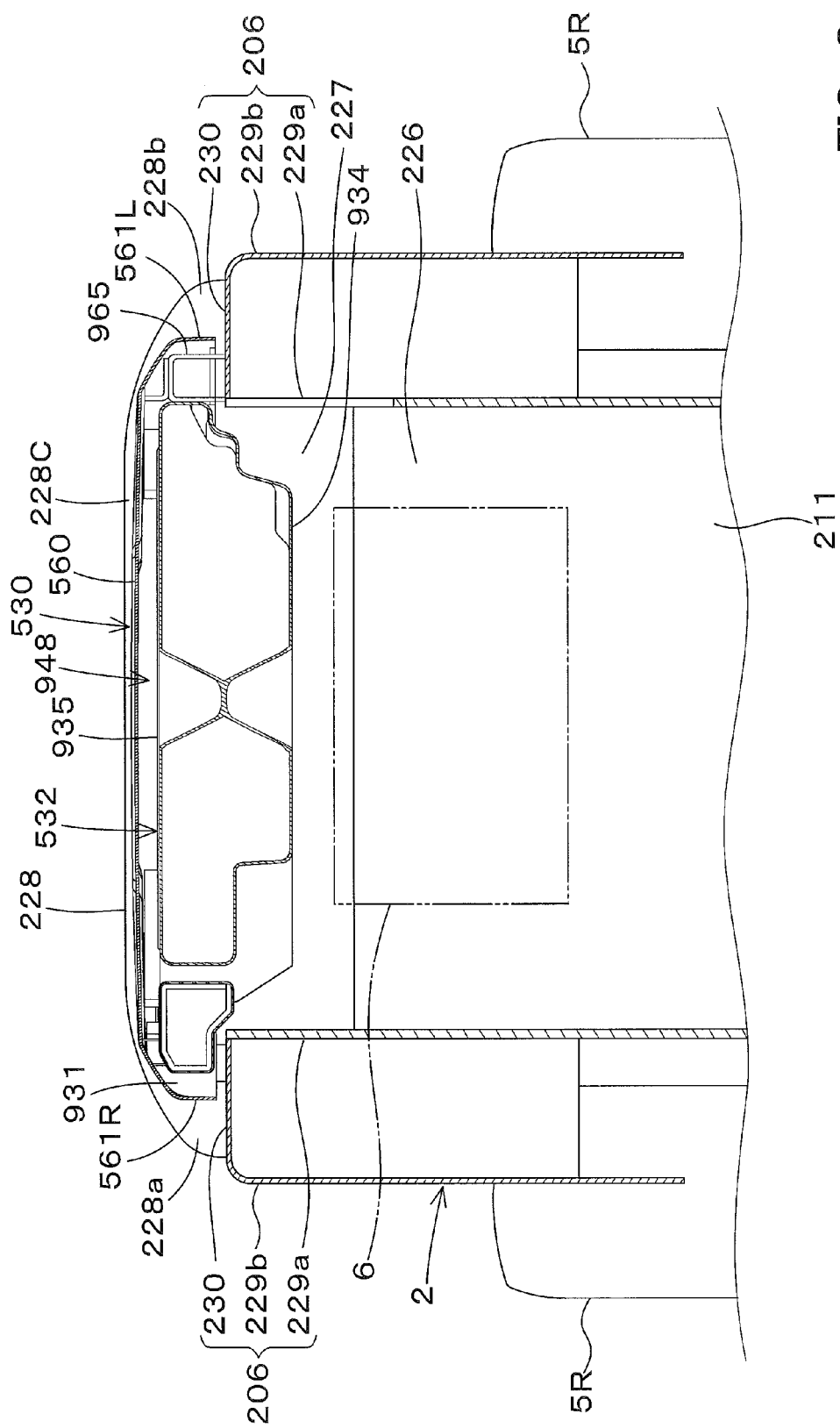
FIG. 2 is a schematic lateral cross-section view of the major portion of the rear portion of the work machine according to the embodiment.
Figure 11:
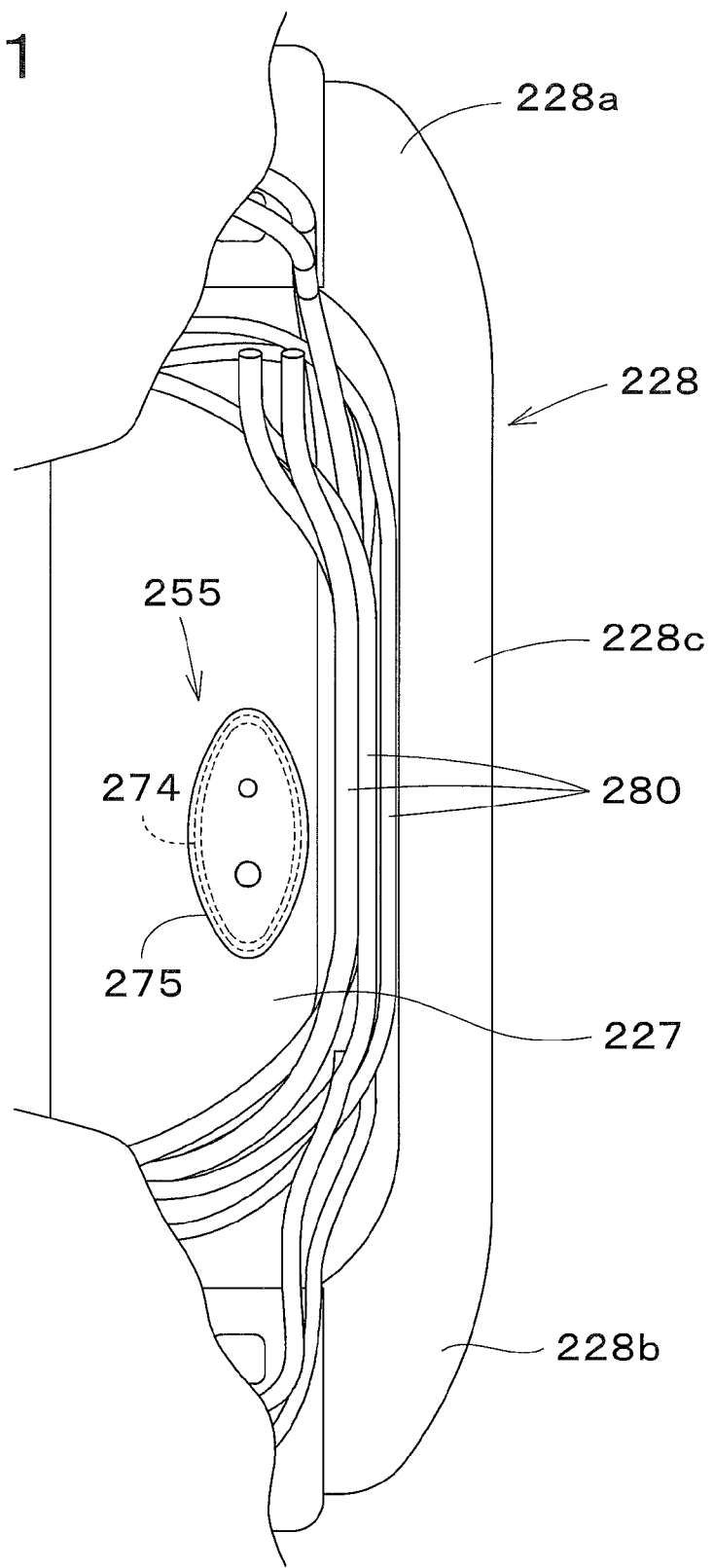
FIG. 11 is a plan view illustrating an area behind the engine according to the embodiment.

As shown in FIG. 2 and FIG. 11, the bottom frame portion 211 includes a main plate 226, a rear plate 227, and a bumper member 228 (a bumper portion). The main plate 226 is disposed extending from the front end of the machine body 2 to the rear portion of the machine body 2. The rear plate 227 is arranged behind the main plate 226 between the support frame 206 disposed on the right side and the support frame 206 disposed on the left side. The rear plate 227 extends from a lower position of a rear portion of the engine 6 toward a backward direction of the engine 6. In addition, the rear plate 227 is disposed being backwardly lifted up to be tilted.

The bumper member 228 is constituted of a piece of plate member, and is arranged on a rear end portion of the machine body 2. The bumper member 228 connects rear portions of the support frames 206 to each other. A right side portion 228a of the bumper member 228 protrudes backward from the support frame 206 disposed on the right side. A left side portion 228b of the bumper member 228 protrudes backward from the support frame 206 disposed on the left side. A joint portion 228c is formed between the right side portion 228a of the bumper member 228 and the left side portion 228b of the bumper member 228, the joint portion 228c being formed to be approximately linear along the machine width direction K. A connecting portion between the joint portion 228c and the right side portion 228a is curved. A connecting portion between the joint portion 228c and the left side portion 228b is curved. The joint portion 228c is placed on a rear end of the rear plate 227 and fixed to the rear end.

As shown in FIG. 2 and FIG. 13, one of the support frames 206 is disposed on a right side of a rear portion of the main frame 205, and the other one of the support frames 206 is disposed on a left side of the rear portion of the main frame 205. Each of the support frames 206 includes a left support frame and a right support frame, the left support frame being arranged on the left side of the left frame portion 209, the right support frame being arranged on the right side of the right frame portion 208. As shown in FIG. 2, each of the support frames 206 (the right support frame and the left support frame) includes: a pair of a support wall 229a and a support wall 229b; and a rear wall 230.

One of the support walls, the support wall 229a, is separated from the other one of the support walls, the support wall 229b, in the horizontal direction perpendicular to the front to rear direction (the machine width direction K). The support wall 229a and the support wall 229b are disposed opposed to each other. The rear wall 230 connects a rear end of the support wall 229a to a rear end of the support wall 229b.

As shown in FIG. 1, the rear portion of the machine body 2 includes an engine room 442 (a motor room), the engine room 442 being configured to house the engine (the motor) 6. A fan 430 is disposed above the engine 442, the fan 430 being configured to cool the engine 6. The fan 430 is arranged inside the duct 435. A radiator 431, an oil cooler, and a condenser 433 are arranged above the duct 435. The oil cooler is arranged in parallel on the left side of the radiator 431, which is not shown in FIG. 1. The radiator 431 cools the cooling water (coolant) supplied to the engine 6. The radiator 431 cools cooling water (coolant), the cooling water being to be supplied to the engine 6. The oil cooler cools the hydraulic operation fluid. The condenser 433 condenses the cooling medium (refrigerant) of an air conditioner (not shown in the drawings) arranged inside the cabin 3. As shown in FIG. 1, a fan motor 434 is arranged below the fan 430. The fan motor 434 is constituted of a hydraulic motor, the hydraulic motor being configured to be driven by a hydraulic operation fluid. The fan motor 434 is arranged vertically extending a revolution shaft of the fan motor 434 in the duct 435, and the fan 430 is connected to the revolution shaft. The fan 430 revolves due to the fan motor 434 when the fan motor 434 is driven, and forms an airflow flowing downwardly.

Figure 3:
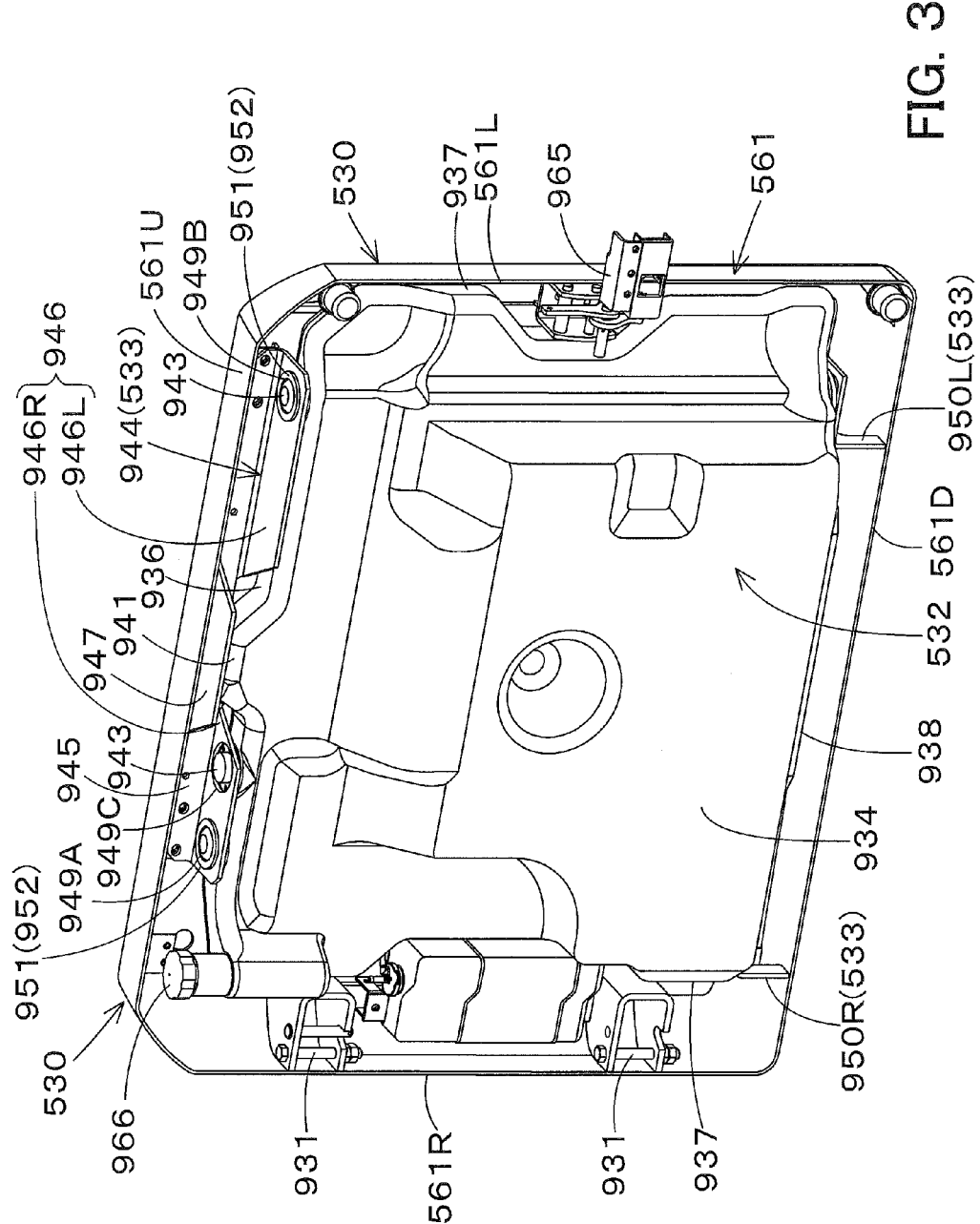
FIG. 3 is a perspective view illustrating a front surface side of a bonnet according to the embodiment, which is seen diagonally downwardly.
Figure 6:
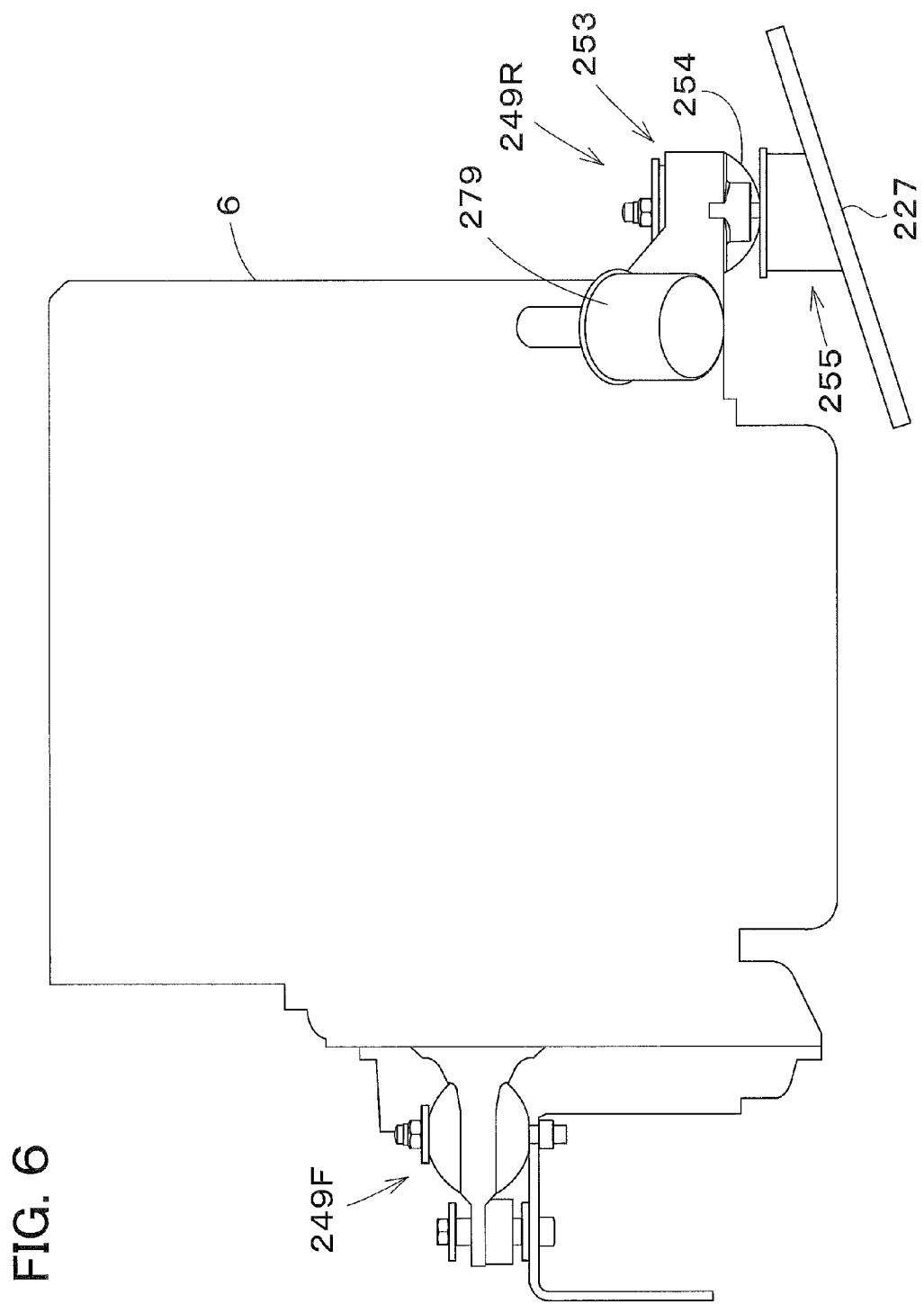
FIG. 6 is a side view illustrating a motor (an engine) according to the embodiment.

As shown in FIG. 1, FIG. 2, and FIG. 6, a bonnet (a rear bonnet) 530 is disposed behind the engine room 442, that is, behind the engine 6, the bonnet 530 being configured to cover a rear portion of the engine 6. As shown in FIG. 2 and FIG. 3, the bonnet 530 is attached to hinges 931 at one end side (a right side) of the bonnet 530, the hinges being disposed on the rear wall 230 of the support frame 206 disposed on the right side. The bonnet 530 is capable of being freely opened and closed by the hinges 931. The bonnet 530 is capable of being supported in a closing position with respect to the machine body 2 by a lock member 965, the lock member 965 being attached to the rear wall 230 of the support frame 206 disposed on the left side. A rear end of the bumper member 228 protrudes backward from the bonnet 530.

Figure 5:
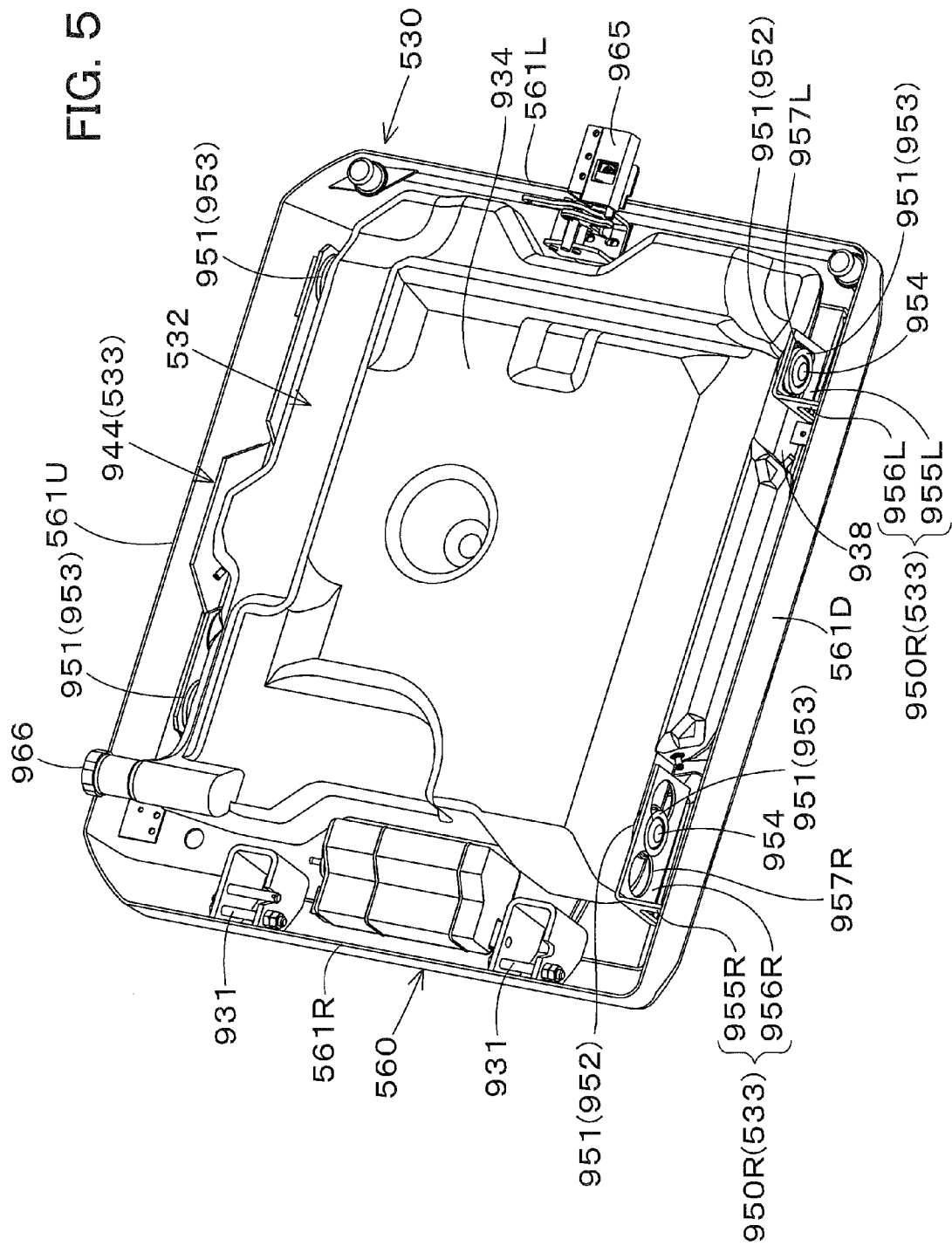
FIG. 5 is a perspective view illustrating the front surface side of the bonnet according to the embodiment, which is seen diagonally upwardly.

As shown in FIG. 3 and FIG. 5, the bonnet 530 includes a rear surface portion 560 and an outer edge portion 561. The rear surface portion 560 has a flat plate shape, the rear surface portion 560 being opposed to the rear walls 230 of the support frames 206.

The outer edge portion 561 includes a left edge portion 561L, a right edge portion 561R, an upper edge portion 561U, and a lower edge portion 561D. The left edge portion 561L protrudes forward from a left edge portion of the rear surface portion 560. The right edge portion 561R protrudes forward from a right edge portion of the rear surface portion 560. The upper edge portion 561U protrudes forward from an upper end portion of the rear surface portion 560. The lower edge portion 561D protrudes forward from a lower end portion of the rear surface portion 560. The outer edge portion 561 is arranged to be close to the rear wall 230 of the support frame 206 when the bonnet 530 is closed. As shown in FIG. 13, the rear wall 230 of the support frame 206 is vertically extended to have a length approximately identical to a vertical length of the bonnet 530.

In this manner, the outer edge portion 561 of the bonnet 530 is arranged to be close to and opposed to the rear wall 230 of the support frame 206. That arrangement suppresses deformation of the bonnet 530 in a longitudinal (vertical) direction as described later in detail.

As shown in FIG. 1 and FIG. 2, a fuel tank 532 (also referred to merely as a tank 532) is disposed between the engine 6 and the bonnet 530. The fuel tank 532 is configured to store fuel. As shown in FIG. 1 to FIG. 3, the fuel tank 532 is supported on a front surface of the bonnet by a support member 533.

The fuel tank 532 is formed of resin in the blow molding. A type of the resin employed for material of the fuel tank 532 is not limited. The thermoplastic resin having fine shock resistance is employed; preferably employed is, for example, the high density polyethylene and the polypropylene. The fuel tank 532 meanwhile may be formed of metal.

A thickness (a length along the front to rear direction) of the fuel tank 532 is smaller than a height (a length along the longitudinal direction) of the fuel tank 532 and a width (a length along the machine width direction K) of the fuel tank 532. The fuel tank 532 includes a front surface portion 934, a rear surface portion 935, an upper surface portion 936, side surface portions 937 (a right side surface portion and a left side surface portion), and a lower surface portion 938.

A front surface of the front surface portion 934 is positioned behind the engine 6 when the bonnet 530 is closed. The rear surface portion 560 of the bonnet 530 is arranged behind the rear surface portion 935. The upper edge portion 561U of the bonnet 530 is arranged above the upper surface portion 936. The right edge portion 561R of the bonnet 530 is arranged outside (on the right side of) the side surface portion (the right side portion) 937 arranged on the right side. The left edge portion 561L of the bonnet 530 is arranged outside (on the left side of) the side surface portion (the left side portion) 937 arranged on the left side. The lower edge portion 561D is arranged below the lower surface portion 938.

Figure 4:
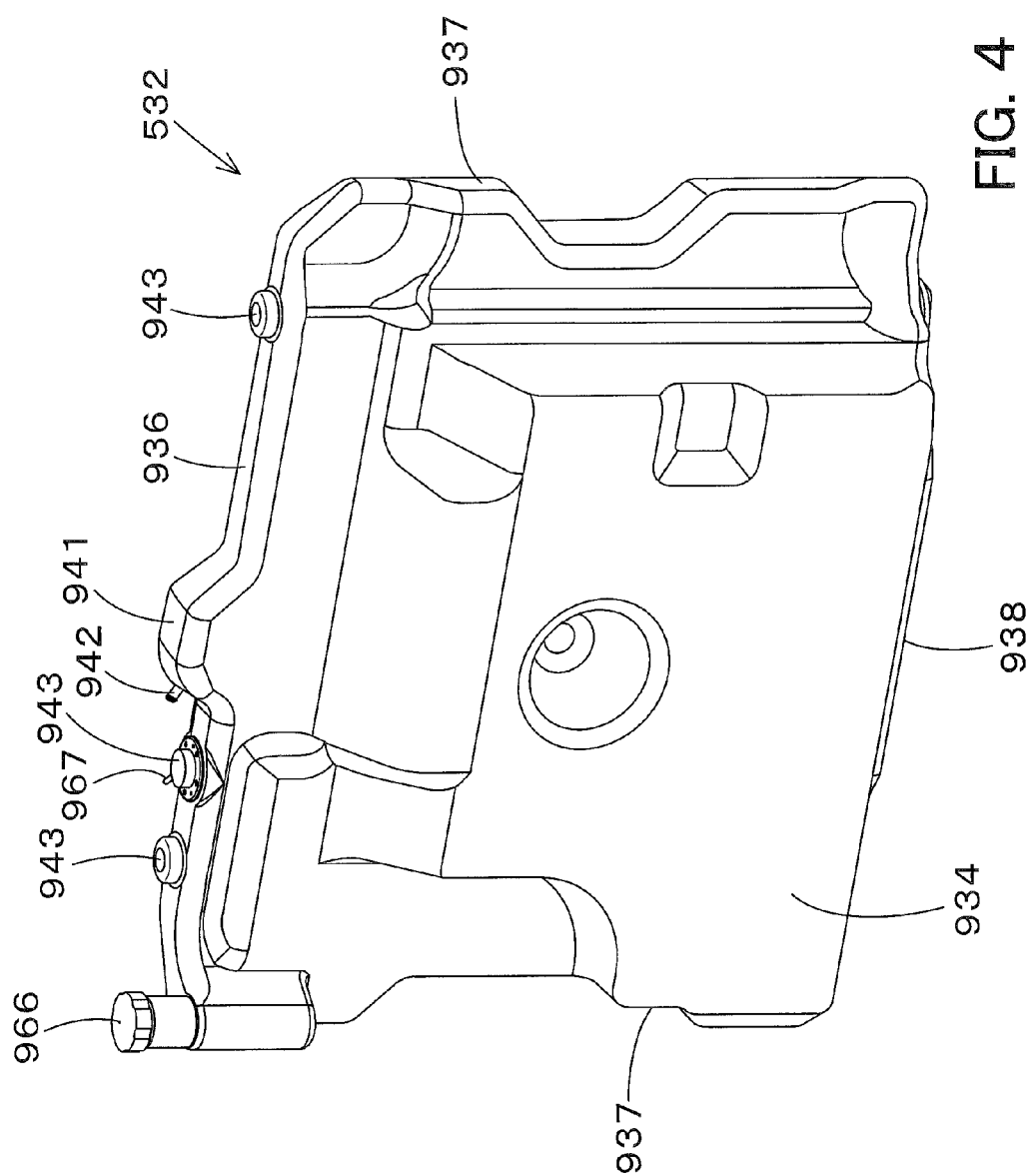
FIG. 4 is a perspective view illustrating a front surface side of a fuel tank according to the embodiment.

As shown in FIG. 4, a protruding portion 941 is formed on the upper surface portion 936 of the fuel tank 532. A part of the upper surface portion 936 is protruded upward; and the protruding portion 941 is formed of the protruded part of the upper surface portion 936. The protruding portion 941 is positioned at an approximately center portion in a longitudinal direction (a direction along an upper edge portion of the bonnet 530) of the upper surface portion 936 of the fuel tank 532. A return tube 942 is disposed on the protruding portion 941, the return tube 942 being used for returning fuel to the fuel tank 532.

As shown in FIG. 4, a filler opening 966 is disposed on a right end portion of the upper surface portion 936 of the fuel tank 532, the filler opening 966 being used for supplying fuel into the fuel tank 532. The filler opening 966 is preferably connected to a filler opening (not shown in the drawings) disposed on an upper surface of the bonnet 530. In this manner, fuel can be filled into the fuel tank 532 with the bonnet 530 closed.

A projecting portion (a projection) 943 is disposed on the upper surface portion 936 of the fuel tank 532, the projecting portion 943 having an approximately cylindrical shape projecting upward. The projecting portions 943 are disposed on a right portion and a left portion of the fuel tank 532, and the protruding portion 941 is between the projecting portion 943 disposed on the right portion and the projecting portion 943 disposed on the left portion. In the example shown in the drawings, the right side has two projecting portions 943, and the left side has one projecting portion 943. Of the three projecting portions 943, one of the projecting portions 943 disposed on the right side and the projecting portion 943 disposed on the left side are used for supporting the fuel tank 532 on the support member 533 as described later.

A supply tube 967 is inserted into the other one of the projecting portions 943 disposed on the right side, the supply tube 967 being used for taking fuel stored in the fuel tank 532 and supplying the fuel to the engine 6 and the like. As shown in FIG. 1, the supply tube 967 extends downward into the fuel tank 532, and a weight 968 is attached to a lower end portion of the supply tube 967.

As shown in FIG. 3 and FIG. 5, the support member 533 includes a bracket 944, a support tool 950L, and a support tool 950R, the bracket 944 being arranged above the tank 532, the support tool 950L and the support tool 950R being arranged below the fuel tank 532.

The bracket 944 includes a first plate portion 945, a second plate portion 946, and a third plate portion 947. The first plate portion 945, the second plate portion 946, and the third plate portion 947 is integrally formed of a metal plate with high rigidity (for example, a stainless steel plate), the metal plate being bent to form the first plate portion 945, the second plate portion 946, and the third plate portion 947.

The first plate portion 945 is a flat plate having an approximately rectangular shape, the flat plate contacting to a front surface of the bonnet 530, and the first plate portion 945 extends in the machine width direction K. The first plate portion 945 is fixed to the front surface of the bonnet 530. Concretely, the first plate portion 945 is fixed to a metal bracket 969 by a bolt as shown in FIG. 1, the metal bracket 969 being a metal tool fixed on the front surface of the bonnet 530.

The second plate portion 946 is formed to have a flat plate shape including a long side and a short side, the long side extending in a direction along the upper edge portion of the bonnet 530, the short side extending forward from a lower edge of the first plate portion 945. The second plate portion 946 separates the fuel tank 532 forward from the bonnet 530 and supports the fuel tank 532. In this manner, a space 948 is formed between the rear surface portion 935 of the fuel tank 532 and the front surface of the bonnet 530 as shown in FIG. 1 and FIG. 2. The space 948 prevents impact from being directly applied to the fuel tank 532 especially when the impact is applied to the bonnet 530 from behind the work machine 1.

In addition, the second plate portion 946 includes a left portion 946L and a right portion 946R. An intermediate portion between the left portion 946L and the right portion 946R is cut and removed (notched). The protruding portion 941 of the fuel tank 532 is arranged in the intermediate portion that is cut and removed (notched).

Edge portions 949 are formed on the left portion 946L of the second plate portion 946 or on the right portion 946R of the second plate portion 946. Each of the edge portions 949 has a circular shape (a track shape) forming an opening portion that has a circular shape (a track shape). One of the edge portions 949 is disposed on the left portion 946L, and two of the edge portions 949 are disposed on the right portion 946R. The projecting portion 943 of the fuel tank 532 is inserted into the opening portion formed by one of the edge portions 949.

A shock-absorbing member 951 is disposed on an edge portion 949A, the edge portion 949A being one of the edge portions 949 and disposed on the left portion 946L. Another shock-absorbing member 951 is disposed on an edge portion 949B, the edge portion 949B being one of the edge portions 949 and disposed on the right portion 946R. Each of the shock-absorbing members 951 is formed of elastic material such as rubber. Each of the shock-absorbing members 951 is a member having an approximately cylindrical shape, and has an upper flange 952 and a lower flange 953. The upper flange 952 is positioned on an upper surface of the second plate portion 946. The lower flange 953 is positioned between the upper surface portion 936 of the fuel tank 532 and a lower surface of the second plate portion 946.

The shock-absorbing member 951 prevents the projecting portion 943 of the fuel tank 532 from directly contacting to the edge portions 949A and 949B each having a circular shape. The shock-absorbing member 951 cushions and absorbs impact to be applied to the fuel tank 532, the impact being applied to the bonnet 530 and transmitted via the bracket 944 from the bonnet 530 to the fuel tank 532.

A edge portion 949C, one of the edge portions 949, is different from the edge portions 949B and disposed on the right portion 946R. The edge portion 949C is not provided with the shock-absorbing member 951. A space is formed between the edge portion 949C and the projecting portion 943. The space allows the fuel tank 532 to be slightly vibrated.

The third plate portion 947 is positioned above the second plate portion 946. The third plate portion 947 is formed to have a flat plate shape including a long side and a short side, the long side extending in a direction along the upper edge portion of the bonnet 530, the short side extending forward from an upper edge of the first plate portion 945. The third plate portion 947 is disposed between the left portion 946L and the right portion 946R. The third plate portion 947 is arranged above the protruding portion 941 of the fuel tank 532.

As shown in FIG. 5, a projecting portion (a projection) 954 is disposed on the lower surface portion 938 of the fuel tank 532, the projecting portion 954 having an approximately cylindrical shape projecting downward. The projecting portions 954 are disposed on a right portion and a left portion of the fuel tank 532. In the example shown in the drawings, the right side has one projecting portion 954, and the left side has two projecting portions 954. The projecting portions 954 support the fuel tank 532 on the support tools 950L and 950R.

The left support tool 950L supports the left portion of the lower surface portion 938 of the fuel tank 532. The right support tool 950R supports the right portion of the lower surface portion 938 of the fuel tank 532. Each of the left support tool 950L and the right support tool 950R is formed of a metal plate with high rigidity (for example, a stainless steel plate), the metal plate being bent to have an L-shape.

The left support tool 950L includes a horizontal portion 955L and a vertical portion 956L. The horizontal portion 955L contacts to the lower surface portion 938 of the fuel tank 532. The vertical portion 956L contacts to an upper surface of the outer edge portion 561 included in a lower portion of the bonnet 530. An edge portion 957L is formed on the horizontal portion 955L, the edge portion 957L having a circular shape (a track shape) forming an opening portion that has a rectangular shape. The projecting portion 954 is inserted into the opening portion formed by the edge portion 957L having a circular shape, the projecting portion 954 being disposed on a left portion of the lower surface 938 of the fuel tank 532.

The right support tool 950R includes a horizontal portion 955R and a vertical portion 956R. The horizontal portion 955R contacts to the lower surface portion 938 of the fuel tank 532. The vertical portion 956R contacts to an upper surface of the outer edge portion 561 included in the lower portion of the bonnet 530. An edge portion 957R is formed on the horizontal portion 955R, the edge portion 957R having a circular shape (a track shape) forming an opening portion. As shown in FIG. 5, the edge portion 957R having a circular shape (a track shape) is formed of three circular opening portions intersecting (or interlocking) to each other. The projecting portion 954 is inserted into the opening portion formed as a center opening portion of the three circular opening portions intersecting to each other, the projecting portion 954 being disposed on the right portion of the lower surface portion 938 of the fuel tank 532. The opening portion for insertion of the projecting portion 954 however can be chosen from among the three opening portions on the basis of a positional relationship between the fuel tank 532 and the right support tool 950R.

Another shock-absorbing member 951 is attached to an edge portion 957L, the edge portion 957L having a circular shape (a track shape) and disposed on the left support tool 950L. The shock-absorbing member 951 has a configuration identical to the configuration of the shock-absorbing member attached between the projecting portion 943 of the fuel tank 532 and the edge portion 949 of the bracket 944, and has an upper flange 952 and a lower flange 953. The upper flange 952 is positioned between the horizontal portion 955L and the lower surface portion 938 of the fuel tank 532. The lower flange 953 is positioned on a lower surface of the horizontal portion 955L.

The edge portion 957R is also provided with another shock-absorbing member 951 having the identical configuration, the edge portion 957R having a circular shape (a track shape) and being formed on the right support tool 950R. The upper flange 952 of the shock-absorbing member 951 is positioned between the horizontal portion 955R and the lower surface portion 938 of the fuel tank 938. The lower flange 953 of the shock-absorbing member 951 is positioned on a lower surface of the horizontal portion 955R.

The shock-absorbing member 951 prevents the projecting portion 954 of the fuel tank 532 from directly contacting to the support tools 950L and 950R. The shock-absorbing member 951 cushions and absorbs impact to be applied to the fuel tank 532, the impact being applied to the bonnet 530 and transmitted via the support tools 950L and 950R from the bonnet 530 to the fuel tank 532.

The opening portion is formed by the edge portion 957L of the left support toll 950L and has a rectangular shape, and thus provides a space between the edge portion 957L and the projecting portion 954 of the fuel tank 532, the projecting portion 954 having a cylindrical shape. The space allows the fuel tank 532 to slightly move in a horizontal direction.

The fuel tank 532 mentioned above is disposed between the bonnet 530 and the engine 6 arranged in the rear portion of the machine body 2. In this manner, a sufficient capacity of the fuel tank 532 can be allowed without increment of a height of the bonnet 530 and of a machine width of the work machine 1.

In addition, the fuel tank 532 is supported on a front surface (a surface facing the engine 6) of the bonnet 530 by the support member 533. Thus, the fuel tank 532 moves together with the bonnet 530 when the bonnet 530 is opened, and then the fuel tank 532 comes out of the machine body 2. The engine 6 accordingly can be easily accessed from behind the machine body 2 when the bonnet 530 is opened, and thus maintenance of the engine 6 can be made easily. Compared to a case where the fuel tank 532 is arranged below or beside the engine 6, the fuel tank 532 can be easily attached to and detached from the work machine 1, and the water draining of the fuel tank 532 can be easily made.

In addition, the bonnet 530 includes the outer edge portion 561 positioned being close to and opposed to the rear wall 230 of the support frame 206. In this manner, when an object extending in a lateral direction (a bumper of another vehicle and the like) hits the bonnet 530 from behind, the rear wall 230 of the support frame 206 can accept a force applied to the bonnet 530 by the hit. Thus, the bonnet 530 can be hardly deformed in the vertical direction.

The first plate portion 945, the second plate portion 946, and the third plate portion 947 extend along the bonnet 530 in the machine width direction K. In this manner, the third plate portion 947 suppresses deformation of the bonnet 530 even when an object (an iron pole and the like) extending in the vertical direction hits the bonnet 530 from behind. The bonnet 530 thus is hard to be deformed in the lateral direction. The bonnet 530 specifically has the high rigidity hard to be deformed in both of the vertical direction and the lateral direction, thereby protecting the fuel tank 532.

In addition, the bonnet 530 includes the rear surface portion 560, the left edge portion 561L, the right edge portion 561R, the upper edge portion 561U, and the lower edge portion 561D. In this manner, the bonnet 530 is capable of covering the fuel tank 532 and protecting the fuel tank 532.

The bracket 944 separates the fuel tank 532 forward from the bonnet 530 and supports the fuel tank 532. In this manner, even when an object hits the bonnet 530 from behind to deform the bonnet 530, the deformation is hard to reach the fuel tank 532, and thereby the fuel tank 532 is protected.

Furthermore, the provision of the shock-absorbing member 951 absorbs and cushions impact when the impact is applied to the bonnet 530, and then the cushioned impact is transmitted to the fuel tank 532. In this manner, the provision of the shock-absorbing member 951 protects the fuel tank 532.

Moreover, the fuel tank 532 is capable of being fixed to the bonnet 530 without a member for fastening and fixing such as a band. In this manner, the fixing structure for the fuel tank 532 reduces the number of components, thereby being simplified.

As shown in FIG. 6, a mount member 249F is disposed on a front side of the engine 6 and a mount member 249R is disposed on a rear side of the engine 6. The mount member 249F and the mount member 249R are configured to support the engine 6. The front side of the engine 6 is supported by a pair of the mount members 249F disposed on the front side. The rear side of the engine 6 is supported by a single of the mount member 249F disposed on the rear side.

Figure 7:
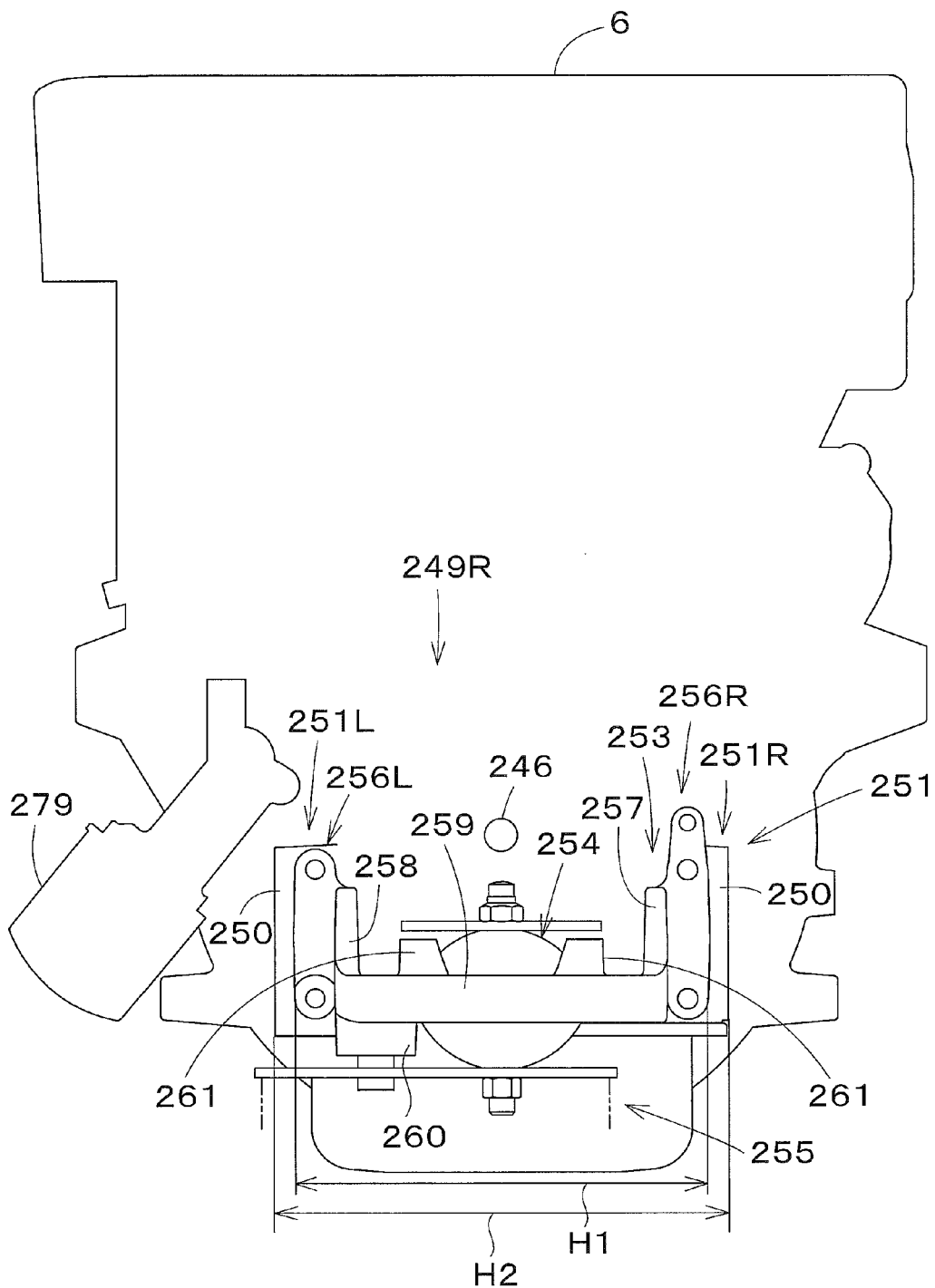
FIG. 7 is a back view illustrating the engine according to the embodiment.

As shown in FIG. 7, an output shaft 264 projects from a lower portion of a rear portion (a back surface) of the engine 6. Specifically, the output shaft 246 projects from the rear portion (the back surface) that is opposite to a front surface of the engine 6. The output shaft 246 drives a compressor and an alternator.

A rear portion attachment 251 is disposed on the back surface of the engine 6, that is, on a portion under a rear end side of the output shaft 264, the rear portion attachment 251 having an attachment surface 250 that faces backward. The rear portion attachment 251 includes a first attachment portion 251R and a second attachment portion 251L, the first attachment portion 251R being disposed on the right side, the second attachment portion 251L being disposed on the left side.

Figure 9:
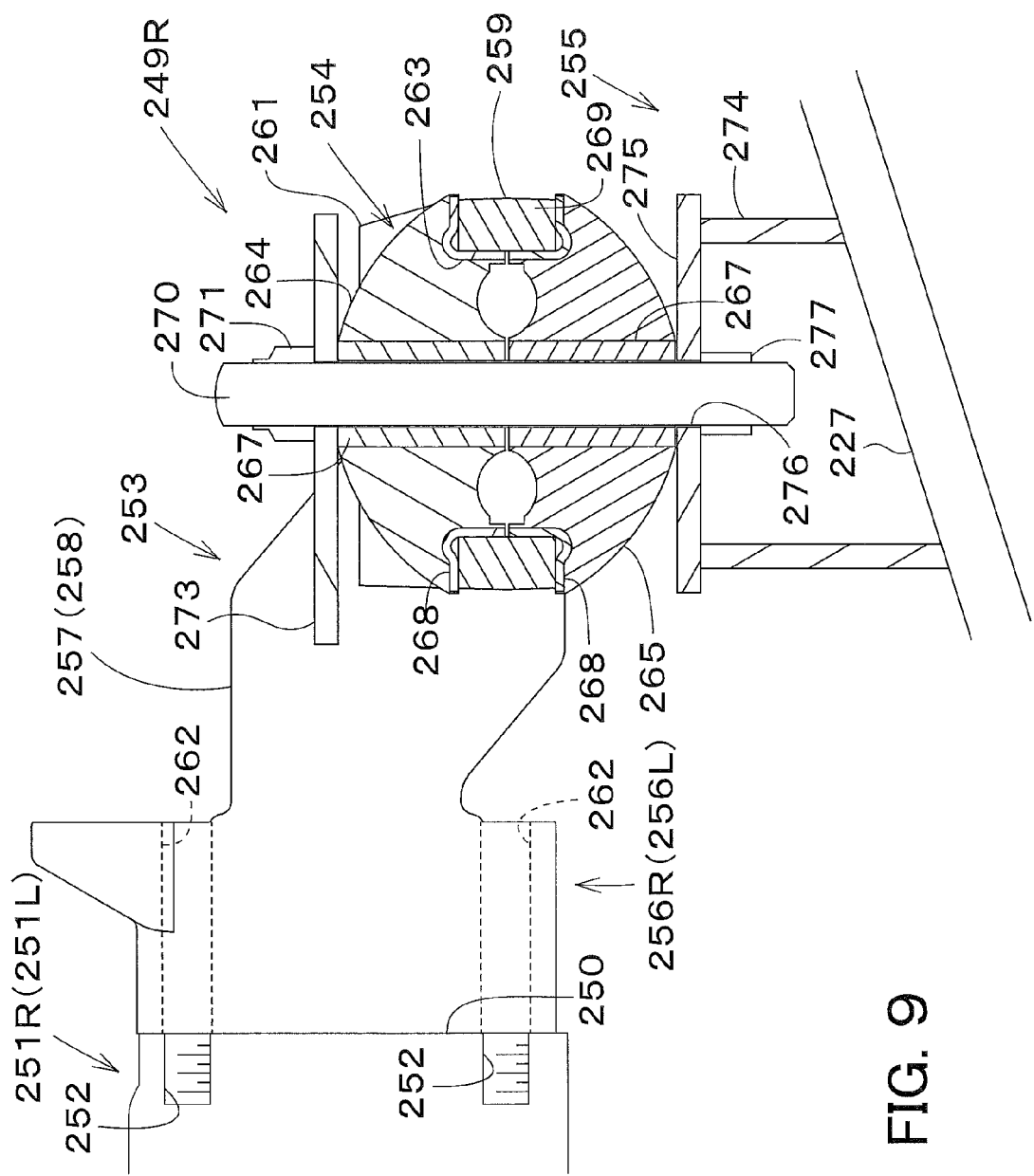
FIG. 9 is a side view illustrating a cross-section of the mount member according to the embodiment.

As shown in FIG. 9, the attachment surface 250 of the first attachment portion 251R is provided with a screw hole 252, and the attachment surface 250 of the second attachment portion 251L is provided with another screw hole 252. The first attachment portion 251R and the second attachment portion 251L are integrally formed in the casting process on a crankcase of the engine 6.

Figure 10:
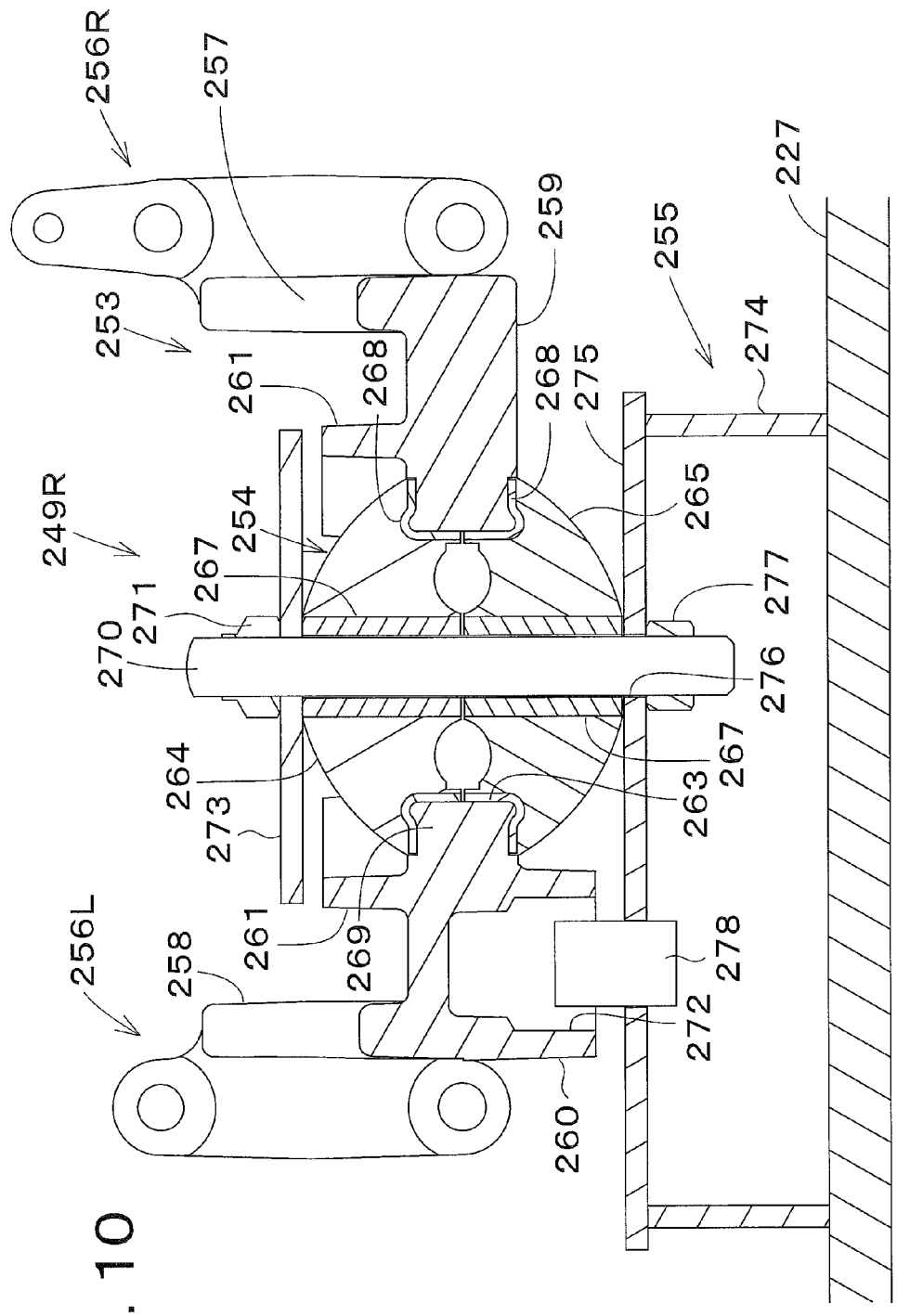
FIG. 10 is a back view illustrating the mount member according to the embodiment.

As shown in FIG. 9 and FIG. 10, the mount member 249R disposed on the rear side includes a first support member 253, an elastic member 254, and a second support member 255. The first support member 253 is attached to the first attachment portion 251R and to the second attachment portion 251L. The elastic member 254 is attached to the first support member 253. The second support member 255 supports the elastic member 254.

Figure 8:
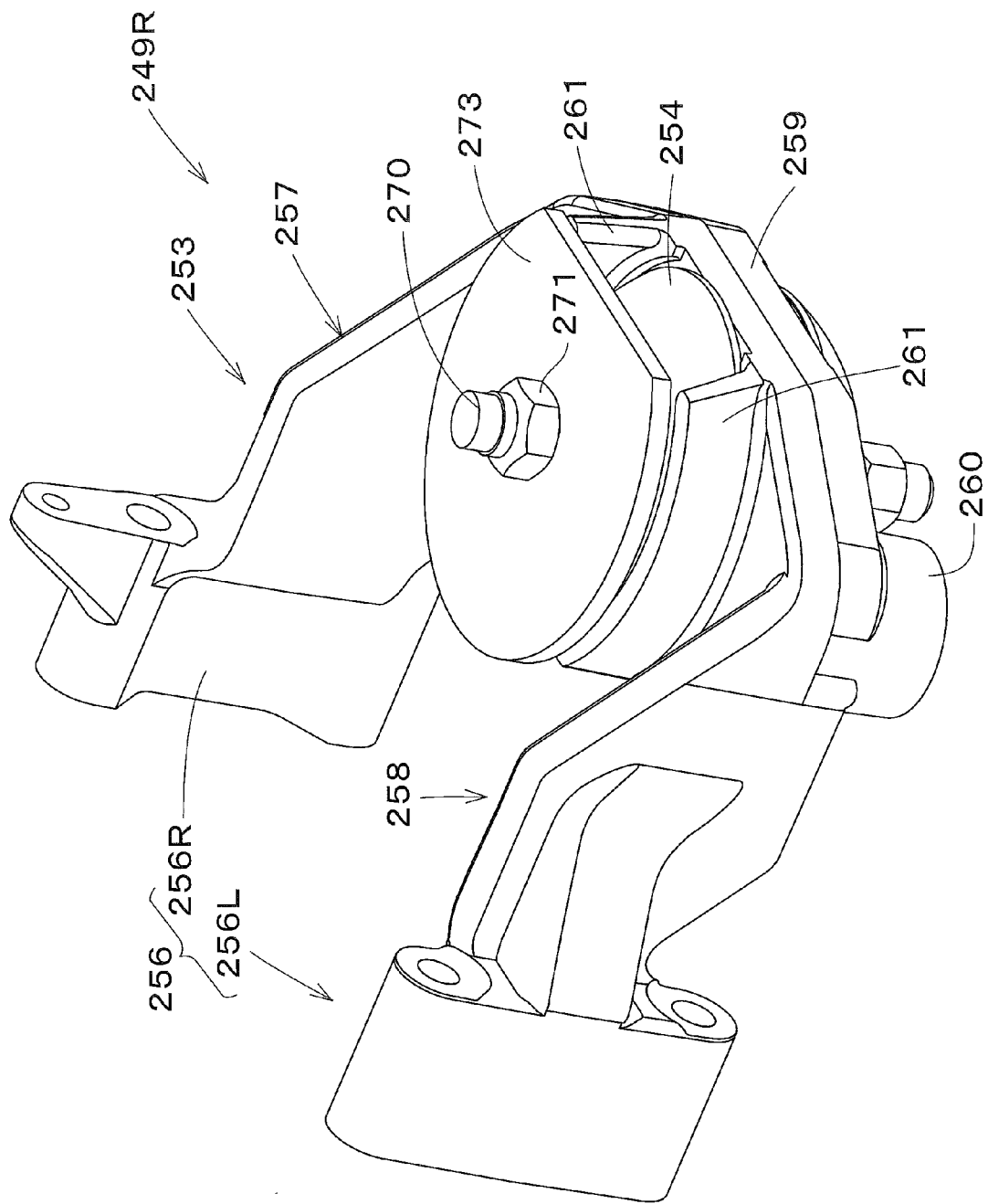
FIG. 8 is a perspective view illustrating a mount member according to the embodiment.

As shown in FIG. 8, FIG. 9, and FIG. 10, the first support member 253 includes an opposite attachment portion 256, a first arm portion 257, a second arm portion 258, a coupling portion 259, a first projecting portion 260, and a second projecting portion 261.

The opposite attachment portion 256 includes a third attachment portion 256R and a fourth attachment portion 256L, the third attachment portion 256R being disposed on the right side, the fourth attachment portion 256L being disposed on the left side. The third attachment portion 256R is attached opposed to the first attachment portion 251R. The fourth attachment portion 256L is attached opposed to the second attachment portion 251L.

As shown in FIG. 9, the third attachment portion 256R is provided with a bolt insertion hole 262 that penetrates the third attachment portion 256R in the front to rear direction, and the fourth attachment portion 256L is provided with another bolt insertion hole 262 that penetrates the fourth attachment portion 256L in the front to rear direction. A bolt is inserted from behind the engine 6 to the bolt insertion hole 262 of the third attachment portion 256R, and another bolt is inserted from behind the engine 6 to the bolt insertion hole 262 of the fourth attachment portion 256L. Then, the bolts are screwed into the screw holes 252 of the first attachment portion 251R and the second attachment portion 251L, and thereby the first support member 253 (the third attachment portion 256R and the fourth attachment portion 256L) is attached to the first attachment portion 251R and the second attachment portion 251L.

The first arm portion 257 extends backward (toward an approximately directly backward direction) from the third attachment portion 256R. The second arm portion 258 extends backward (toward an approximately directly backward direction) from the fourth attachment portion 256L.

The coupling portion 259 couples the first arm portion 257 and the second arm portion 258 to each other. The elastic member 254 is attached to the coupling portion 259. The coupling portion 259 forms an attachment hole 263 used for attachment of the elastic member 254.

The elastic member 254 is formed of rubber (or rubbery elastic member). The elastic member 254 can be divided into an upper portion and a lower portion. The upper portion is an upper cushioning member 264 having a hemisphere shape, and the lower portion is a lower cushioning member 265 having a hemisphere shape. A cylindrical body 267 vertically penetrates the upper cushioning member 264 and is fixed to the upper cushioning member 264, and another cylindrical body 267 vertically penetrates the lower cushioning member 265 and is fixed to the lower cushioning member 265. A ring member 268 is fixed to a lower circumference of the upper cushioning member 264. Another ring member 268 is fixed to an upper circumference of the lower cushioning member 265.

The ring member 268 of the upper cushioning member 264 is fitted to the attachment hole 263 from above. The ring member 268 of the lower cushioning member 265 is fitted to the attachment hole 263 from below. A wall portion 269 is sandwiched by the ring member 268 of the upper cushioning member 264 and the ring member 268 of the lower cushioning member 265, the wall portion 269 being disposed around the attachment hole 263.

A press plate (a restriction member) 273 is disposed above the upper cushioning member 264. A stud bolt 270 penetrates the press plate 273 and is inserted into the cylindrical bodies 267. A nut 271 is screwed to an upper end side of the stud bolt 270.

The first projecting portion 260 projects downward from a lower surface of the coupling portion 259. The first projecting portion 260 is formed to have a cylindrical shape opening downward. An internal portion of the first projecting portion 260 serves as an insertion hole 272 that is formed by an edge portion having a circular shape (a track shape).

The second projecting portions 261 project upward from the coupling portion 259. One of the second projecting portions 261 is disposed on a lateral side of the attachment hole 263 and extends along the edge portion of the attachment hole 263. The other one of the second projecting portions 261 is disposed on an opposite lateral side of the attachment hole 263 and extends along the edge portion of the attachment hole 263. In addition, the second projecting portion 261 is positioned below the press plate 273.

The second support member 255 is positioned below the coupling portion 259. The second support member 255 includes a cylindrical body 274 and a fixing portion 275.

The cylindrical body 274 is fixed to an upper surface of the rear plate 227 of the bottom plate portion 211 of the machine body 2. The cylindrical body 274 has an elliptical cylindrical shape that is horizontally long in a plan view.

The fixing portion 275 is constituted of a plate member and has an elliptical shape in the plan view. The fixing portion 275 closes an opening disposed on an upper end of the cylindrical body 274. In addition, the fixing portion 275 is fixed to the upper end of the cylindrical body 274. The elastic member 254 is mounted on an upper surface of the fixing portion 275, and elastically supports the engine 6. That is, the elastic member 254 cushions the vibration from the engine 6.

The fixing portion 275 is provided with an edge portion having a circular shape (a track shape), the edge portion forming an insertion hole 276. The stud bolt 270 is inserted into the insertion hole 276. A nut 277 is fixedly attached to a portion corresponding to the insertion hole 276 that is formed on a lower surface of the fixing portion 275. A lower end side of the stud bolt 270 is inserted into the insertion hole 276, and a lower end of the stud bolt 270 is screwed to the nut 277. The nut 271 screwed to the upper end side of the stud bolt 270 is tightly fastened, and thereby the elastic member 254 is attached to the second support member 255.

The fixing portion 275 is provided with a projecting member 278 projecting upward. The projecting member 278 is formed of a cylindrical rod member. The projecting member 278 is inserted into the insertion hole 272 of the first projecting portion 260.

The first projecting portion 260 and the second projecting portion 261 form a stopper that restricts a deformation amount of the elastic member 254. Specifically, the deformation amount of the elastic member 254 is restricted by the first projecting portion 260 contacting to the second support member 255 and by the second projecting portion 261 contacting to the press plate 273.

In addition, deformation of the elastic member 254 is restricted in the horizontal direction by the projecting member 278 contacting to the edge portion (an inner surface) of the insertion hole 272 of the first projection portion 260.

The mount member 249R described above includes the rear portion attachment 251 on the rear portion of the engine 6, the rear portion attachment 251 facing backward. The first support member 253 of the mount member 249R includes the opposite attachment portion 256 attached opposed to the rear portion attachment 251. In this manner, the first support member 253 of the mount member 249R is attached to the rear portion attachment 251 of the rear portion of the engine 6 from behind. Thus, a space for attachment of the first support member 253 is not required on a lateral side of the rear portion of the engine 6, and accordingly that allows suitable layout of peripheral components provided on the rear portion of the engine 6 and easy maintenance.

The opposite attachment portion 256, the first arm portion 257, the second arm portion 258, the coupling portion 259, the first projecting portion 260, and the second projecting portion 261 are integrally formed in the casting process, and thus the first support member 253 is formed in a compact size.

In addition, as shown in FIG. 7, a width H1 of the first support member 253 is equal to or less than an interval H2 between outer side surfaces of the first attachment portion 251R and the second attachment portion 251L. In this manner, the first support member 253 does not protrudes from the rear portion attachment 251 in the width direction. Thus, that improves the suitable layout of peripheral components provided on the rear portion of the engine 6 and the easy maintenance. In a case where an engine oil filter 279 is arranged on the left side of the rear portion of the engine 6, easy maintenance to the engine oil filter 279 can be improved. Moreover, the first support member 253 is formed in the casting process, and thus the structure of the first support member 253 can be simplified.

The first projecting portion 260 and the second projecting portion 261 are integrally formed as the first support member 253 in the casting process, the first projecting portion 260 and the second projecting portion 261 constituting the stopper for restricting the deformation amount of the elastic member 254, and thus the number of components can be reduced.

As shown in FIG. 11, a plurality of hydraulic hoses 280 laterally crossing the machine body 2 are disposed between the second support member 255 and the bumper member 228. The hydraulic hoses 280 laterally crossing the machine body 2 are collectively arranged on a bottom portion of the machine body 2 behind the engine 6, and thus the hydraulic hoses 280 laterally crossing the machine body 2 do not interfere check and maintenance to an internal portion of the machine body 2. In addition, the hydraulic hoses 280 are collectively arranged behind the engine 6, and thus the hydraulic hoses 280 can be easily arranged when the bonnet 530 is opened. In addition, since the hydraulic hoses 280 are collectively arranged behind the engine 6, the hydraulic hoses 280 can be easily installed in the manufacturing of the work machine 1. Moreover, since the hydraulic hoses 280 are collectively arranged behind the engine 6, the hydraulic hoses 280 can be arranged in a large bending radius, and thus the hydraulic hoses 280 are hard to be worn and softened by hydraulic pulsations.

Since the cylindrical body 274 of the second support member 255 has the elliptical cylindrical shape in a plan view, the cylindrical body 274 serves as a hose guide for the hydraulic hoses 280. In addition, a connecting portion between the joint portion 228c and the right side portion 228a of the bumper member 228 is curved, and a connecting portion between the joint portion 228c and the left side portion 228b is curved. Thus, the bumper member 228 also serves as the hose guide for the hydraulic hoses 280. The second support member 255 and the bumper member 228 are employed as the guide member for the hydraulic hoses 280, and thus are employed as members for various purposes.

Figure 12:
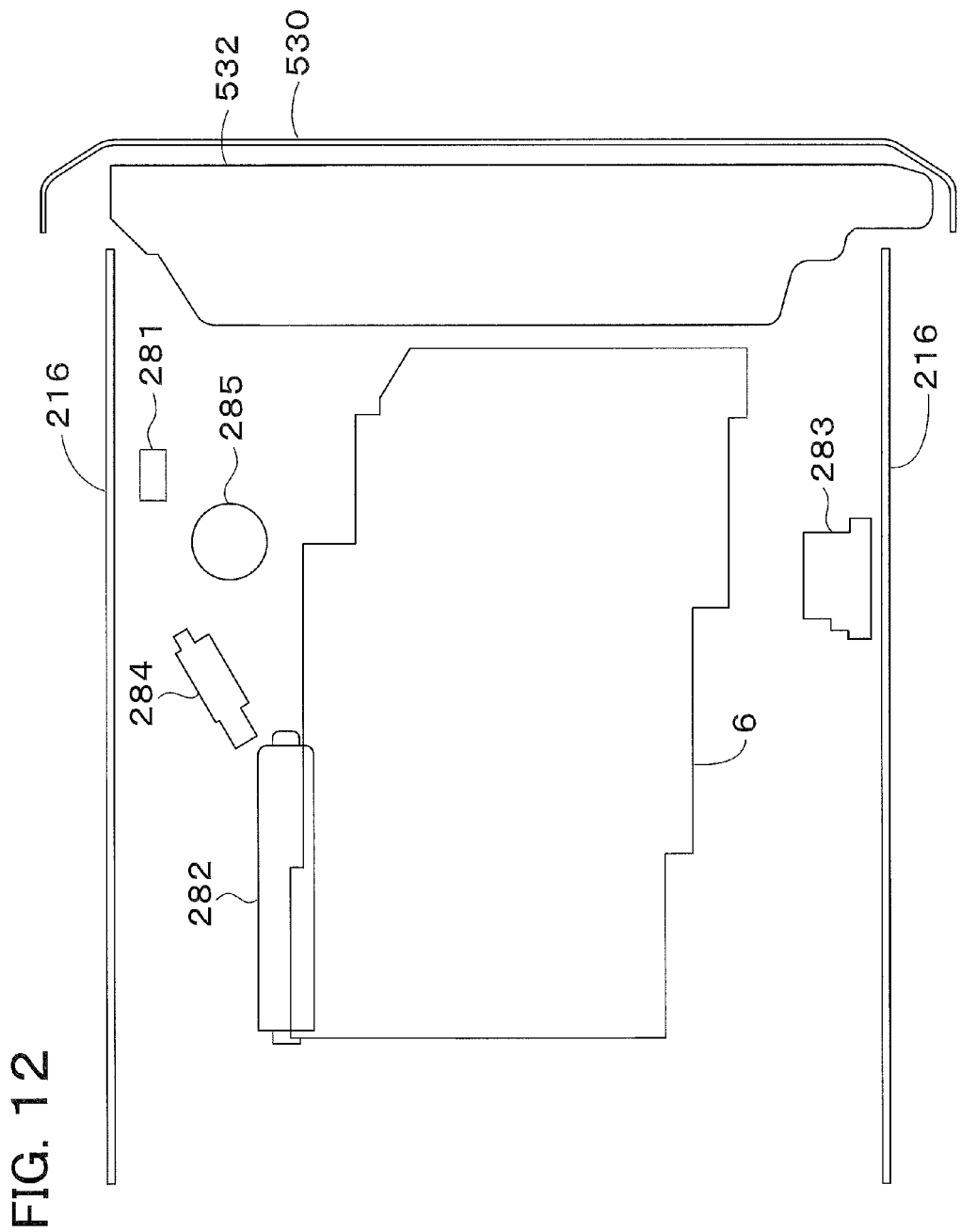
FIG. 12 is a schematic plan view illustrating an area around the engine according to the embodiment.

As shown in FIG. 12, a ride control valve 281, an accumulator 282, a bucket level control valve 283, a quick hitch valve 284, and an oil filter 285 are disposed lateral to the engine 6 and in front of the bonnet 530.

The ride control valve 281 is a valve for reducing the pitching and bounding of the machine body 2, the pitching and bounding being caused when the machine body 2 runs uneven terrain in an operation to carry gravel, crushed rock, and the like. The ride control valve 281 is controlled to be opened and closed and thereby makes the accumulator 282 absorb fluctuation of a bottom pressure of the boom cylinder 14. The bucket level control valve 283 is a valve for controlling the bucket cylinder 15 in an upward movement and a downward movement of the boom 10 and thereby keeps the bucket 11 in a substantially identical attitude in order to prevent the gravel, crushed rock, and the like in the bucket 11 from falling from the bucket 11.

The quick hitch valve 284 is a valve for controlling the lock cylinder 203 of the attachment device 201. The oil filter 285 is a filter for removing a foreign substance included in a pilot fluid (a pilot oil) discharged from a pump (not shown in the drawing). The oil filter 285 is a component to be replaced periodically.

The ride control valve 281, the accumulator 282, the bucket level control valve 283, the quick hitch valve 284, and the oil filter 285 can be easily accessed when the bonnet 530 is opened, thereby improving the easy maintenance.

In addition, some specification of the work machine 1 installs the ride control valve 281, the bucket level control valve 283, and the quick hitch valve 284 additionally as optional parts. In that case, installation positions of the ride control valve 281, the bucket level control valve 283, and the quick hitch valve 284 are arranged on positions in the rear portion of the machine body 2, the positions being easily-accessible when the bonnet 530 is opened, and thereby the ride control valve 281, the bucket level control valve 283, and the quick hitch valve 284 are easily installed additionally.

The work machine according to the embodiment of the present invention includes: the machine body; the motor mounted on the rear portion of the machine body; the bonnet covering the rear of the motor and disposed to be freely opened and closed; the fuel tank disposed between the motor and the bonnet; and the support member supporting the fuel tank on the bonnet. In this manner, compared to a case where the fuel tank is arranged below the engine, a height of the bonnet can be reduced, and a rearward sight of an operator can be sufficiently obtained. In addition, according to the work machine of the embodiment, a chain case does not restrict an arrangement space for the fuel tank as in a case where the fuel tank is arranged beside the engine. In this manner, the fuel tank can be arranged without increasing the machine width, and thus a sufficient capacity of the fuel tank can be obtained.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

Obviously, numerous modifications and variations of the present invention are possible in light of the above teachings. It is therefore to be understood that within the scope of the appended claims, the invention may be practiced otherwise than as specifically described herein.

What is claimed is:

1. A work machine comprising:
   a machine body;
   a motor provided in a rear portion of the machine body;
   a bonnet which covers a rear of the motor and which is openable;
   a tank disposed between the motor and the bonnet; and
   a support member including a bracket supporting the tank on the bonnet such that the tank is spaced from the bonnet, the bracket including:

a first plate fixed to a front surface of the bonnet;
a second plate extending from the first plate toward the motor, the second plate supporting the tank such that the tank is spaced from the bonnet; and
a third plate disposed above the second plate.

2. The work machine according to claim 1,
wherein the tank includes a projection,
wherein the second plate includes an edge portion having a circular shape to define an opening portion into which the projection is inserted, and
wherein the work machine comprises a cushioning member disposed between the projection and the edge portion.

3. The work machine according to claim 2,
wherein the tank includes
a front surface portion,
a back surface portion disposed behind the front surface portion,
an upper surface portion disposed on an upper end of the front surface portion,
a lower surface portion disposed on a lower end of the front surface portion,
a left surface portion disposed on a left end of the front surface portion, and
a right surface portion disposed on a right end of the front surface portion, and
wherein the bonnet includes
a rear surface portion disposed behind the back surface portion,
an upper edge portion disposed above the upper surface portion,
a lower edge portion disposed below the lower surface portion,
a left edge portion disposed leftward the left surface portion, and
a right edge portion disposed rightward the right surface portion.

4. The work machine according to claim 1,
wherein the tank includes
a front surface portion,
a back surface portion disposed behind the front surface portion,
an upper surface portion disposed on an upper end of the front surface portion,
a lower surface portion disposed on a lower end of the front surface portion,
a left surface portion disposed on a left end of the front surface portion, and
a right surface portion disposed on a right end of the front surface portion, and
wherein the bonnet includes
a rear surface portion disposed behind the back surface portion,
an upper edge portion disposed above the upper surface portion,
a lower edge portion disposed below the lower surface portion,
a left edge portion disposed leftward the left surface portion, and
a right edge portion disposed rightward the right surface portion.

5. The work machine according to claim 1, wherein the tank is made of resin and molded in a blow molding method.

6. A work machine comprising:
a machine body;
a motor provided in a rear portion of the machine body;
a bonnet disposed behind a rear of the motor;
a tank disposed between the motor and the bonnet; and
a support member including a bracket supporting the tank on the bonnet such that the tank is spaced from the bonnet, the bracket including:
a first plate fixed to a front surface of the bonnet;
a second plate extending from the first plate toward the motor, the second plate supporting the tank such that the tank is spaced from the bonnet; and
a third plate disposed above the second plate.

7. The work machine according to claim 6,
wherein the tank includes a projection,
wherein the second plate includes an edge portion having a circular shape to define an opening portion into which the projection is inserted, and
wherein the work machine comprises a cushioning member disposed between the projection and the edge portion.

8. A work machine comprising:
a machine body;
a motor provided in a rear portion of the machine body;
a bonnet spaced from the motor;
a tank disposed between the motor and the bonnet and including a projection; and
a support member supporting the tank such that the tank is spaced from the bonnet, the support member including an edge portion having a circular shape to define an opening portion through which the projection of the tank is inserted, the support member including a bracket supporting the tank such that the tank is spaced from the bonnet, the bracket including:
a first plate fixed to a front surface of the bonnet;
a second plate extending from the first plate toward the motor, the second plate supporting the tank such that the tank is spaced from the bonnet; and
a third plate disposed above the second plate.

9. The work machine according to claim 8, wherein the edge portion having a circular shape is disposed on the second plate.

* * * * *